US011946311B2

(12) United States Patent
Vos et al.

(10) Patent No.: US 11,946,311 B2
(45) Date of Patent: Apr. 2, 2024

(54) WATER MANAGEMENT SYSTEMS FOR FENESTRATION PRODUCTS

(71) Applicant: Pella Corporation, Pella, IA (US)

(72) Inventors: Jaron Vos, Pella, IA (US); Jason Jungling, Prairie, IA (US); Garrett Meyer, Pella, IA (US); Jon Rahn, Pella, IA (US)

(73) Assignee: Pella Corporation, Pella, IA (US)

( * ) Notice: Subject to any disclaimer, the term of this patent is extended or adjusted under 35 U.S.C. 154(b) by 0 days.

(21) Appl. No.: 17/983,889

(22) Filed: Nov. 9, 2022

(65) Prior Publication Data

US 2023/0071415 A1 Mar. 9, 2023

Related U.S. Application Data

(60) Continuation of application No. 17/185,548, filed on Feb. 25, 2021, now Pat. No. 11,519,217, which is a division of application No. 16/558,971, filed on Sep. 3, 2019, now Pat. No. 10,961,769, which is a division of application No. 15/572,281, filed as application No. PCT/US2016/034621 on May 27, 2016, now Pat. No. 10,400,502.

(60) Provisional application No. 62/167,114, filed on May 27, 2015.

(51) Int. Cl.

| | |
|---|---|
| ***E06B 1/64*** | (2006.01) |
| ***E06B 1/62*** | (2006.01) |
| *E06B 1/70* | (2006.01) |

(52) U.S. Cl.
CPC .................. *E06B 1/64* (2013.01); *E06B 1/62* (2013.01); *E06B 2001/628* (2013.01); *E06B 1/70* (2013.01); *E06B 1/702* (2013.01)

(58) Field of Classification Search
None
See application file for complete search history.

(56) References Cited

U.S. PATENT DOCUMENTS

| | | | | |
|---|---|---|---|---|
| 2,837,784 | A * | 6/1958 | Jannette | E06B 3/302 52/204.597 |
| 3,803,779 | A * | 4/1974 | Kuyper | E06B 3/5454 52/745.15 |
| 5,339,583 | A * | 8/1994 | Hrdlicka | E06B 3/56 52/204.5 |
| 7,036,799 | B2 * | 5/2006 | Shepherd | E04F 11/1853 256/65.01 |
| 9,725,946 | B1 * | 8/2017 | Vassilev | E06B 3/302 |
| 10,316,575 | B2 * | 6/2019 | Hoogland | E06B 3/302 |
| 10,400,502 | B2 * | 9/2019 | Vos | E06B 1/62 |
| 10,961,769 | B2 * | 3/2021 | Vos | E06B 1/62 |
| 2003/0024180 | A1 * | 2/2003 | Hartig | B24B 7/17 52/204.593 |
| 2005/0097839 | A1 * | 5/2005 | Kerscher | E06B 1/68 52/204.1 |
| 2012/0085063 | A1 * | 4/2012 | Pufahl | E06B 1/62 428/141 |

(Continued)

*Primary Examiner* — Joshua K Ihezie
(74) *Attorney, Agent, or Firm* — FAEGRE DRINKER BIDDLE & REATH

(57) ABSTRACT

A flashing includes a first edge, a second edge opposite from the first edge, a first surface, and a second surface on an opposite side of the flashing from the first surface. The first surface and the second surface extend between the first edge and the second edge. The first surface includes a hydrophobic region and a hydrophilic region.

20 Claims, 16 Drawing Sheets

(56) References Cited

U.S. PATENT DOCUMENTS

| | | | | |
|---|---|---|---|---|
| 2014/0047783 | A1* | 2/2014 | Shalit | E06B 3/6722<br>52/171.3 |
| 2014/0087134 | A1* | 3/2014 | Gesford | C09D 175/04<br>428/141 |
| 2018/0171699 | A1* | 6/2018 | Hoogland | E06B 3/302 |

* cited by examiner

WATER MANAGEMENT SYSTEMS FOR FENESTRATION PRODUCTS

CROSS-REFERENCE TO RELATED APPLICATION

The present application is a continuation application of U.S. patent application Ser. No. 17/185,548, filed on Feb. 25, 2021, which is divisional application of U.S. patent application Ser. No. 16/558,971, filed on Sep. 3, 2019, which is a divisional application of U.S. patent application Ser. No. 15/572,281 filed on Nov. 7, 2017, now U.S. Pat. No. 10,400,502, issued Sep. 3, 2019, which is a 371 National Stage Application of International Patent Application No. PCT/US2016/034621, filed May 27, 2016, which claims the benefit of U.S. Provisional Application No. 62/167,114, filed May 27, 2015, all of which are incorporated herein by reference in their entireties.

TECHNICAL FIELD

Embodiments of the present invention relate generally to managing water in and around fenestration products. Specifically, embodiments relate to fenestration flashing and seals between fenestration components to reduce water entry into a building.

BACKGROUND

Buildings and other structures are often constructed with fenestration products, such as windows, skylights, doors, louvers, and vents. The fenestration products may include devices, such as flashing and seals to prevent water entry into the building, for example, during a rainstorm or during a power washing of the building exterior. Pressure differentials between the exterior of the building and the interior of the building can drive water past the flashing or seals, and into the building.

In some cases, a flashing, such as a sill flashing or sill pan, may end up inadvertently slanted toward the interior if the building, causing water to flow to the interior. In other cases, a seal, such as a seal between adjacent fenestration product components may fail as the components shift over time, allowing water to flow to the interior of the building.

SUMMARY

Embodiments of the present invention relate to managing or discouraging water from penetrating into building product, such as a fenestration product, or into a building structure by, for example, penetrating past a fenestration product.

In some embodiments, a flashing includes a first edge, a second edge opposite from the first edge, a first surface, and a second surface on an opposite side of the flashing from the first surface. The first surface and the second surface extend between the first edge and the second edge. The first surface includes a hydrophobic region and a hydrophilic region.

In some embodiments, method for making a flashing includes providing a flashing substrate having a first surface, the first surface including a first region and a second region adjacent to the first region, and changing a contact angle of the first region. The contact angle of the first region is increased to greater than 90 degrees if the flashing substrate has a contact angle less than or equal to 90 degrees. The contact angle of the first region is decreased to less than or equal to 90 degrees if the flashing substrate has a contact angle greater than 90 degrees.

In some embodiments, hydrophobic seal between adjacent product components includes a first surface on a first component and a second surface on a second component. The first surface is characterized by a first contact angle that is greater than 90 degrees. The first component and the second component are adjacent to each other at the first surface and the second surface. The first surface and second surface face each other. At least a portion of the first surface is not in physical contact with the second surface.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Various embodiments described below manage a flow of water for a fenestration product to discourage water from flowing into the fenestration product, or past the fenestration product and into a building structure. Some embodiments employ adjacent hydrophobic and hydrophilic surfaces to manage the flow of water. The surfaces may be on a fenestration flashing, for example, a sill flashing or a flashing tape. Some embodiments employ adjacent hydrophobic surfaces to form a hydrophobic seal to manage the flow of water. The surfaces may be on adjacent fenestration product components. Various additional or alternative features or advantages should be understood with reference to the following description.

Hydrophilic (water loving) surfaces are generally easily wetted, that is, a drop of water deposited on the surface tends to flow out from the drop and along the surface. In contrast, hydrophobic (water fearing) surfaces are generally not wetted, and a drop of water deposited on the surface tends to stay together and not flow across the surface. The degree to which a surface is characterized as hydrophobic or hydrophilic may be indicated by a contact angle between a drop of water on the surface and the surface itself. Contact angle measurements may be performed by a contact angle goniometer, as is known in the art. As defined herein, hydrophilic means a surface exhibiting a contact angle less than or equal to 90 degrees, and decreasing contact angle measurements indicate greater hydrophilicity. Super-hydrophilic means a surface exhibiting a contact angle of about 0 degrees. Hydrophobic means a surface exhibiting a contact angle of greater than 90 degrees, and increasing contact angle measurements indicate greater hydrophobicity. Super-hydrophobic means a surface exhibiting a contact angle greater than 150 degrees.

Figure 1:
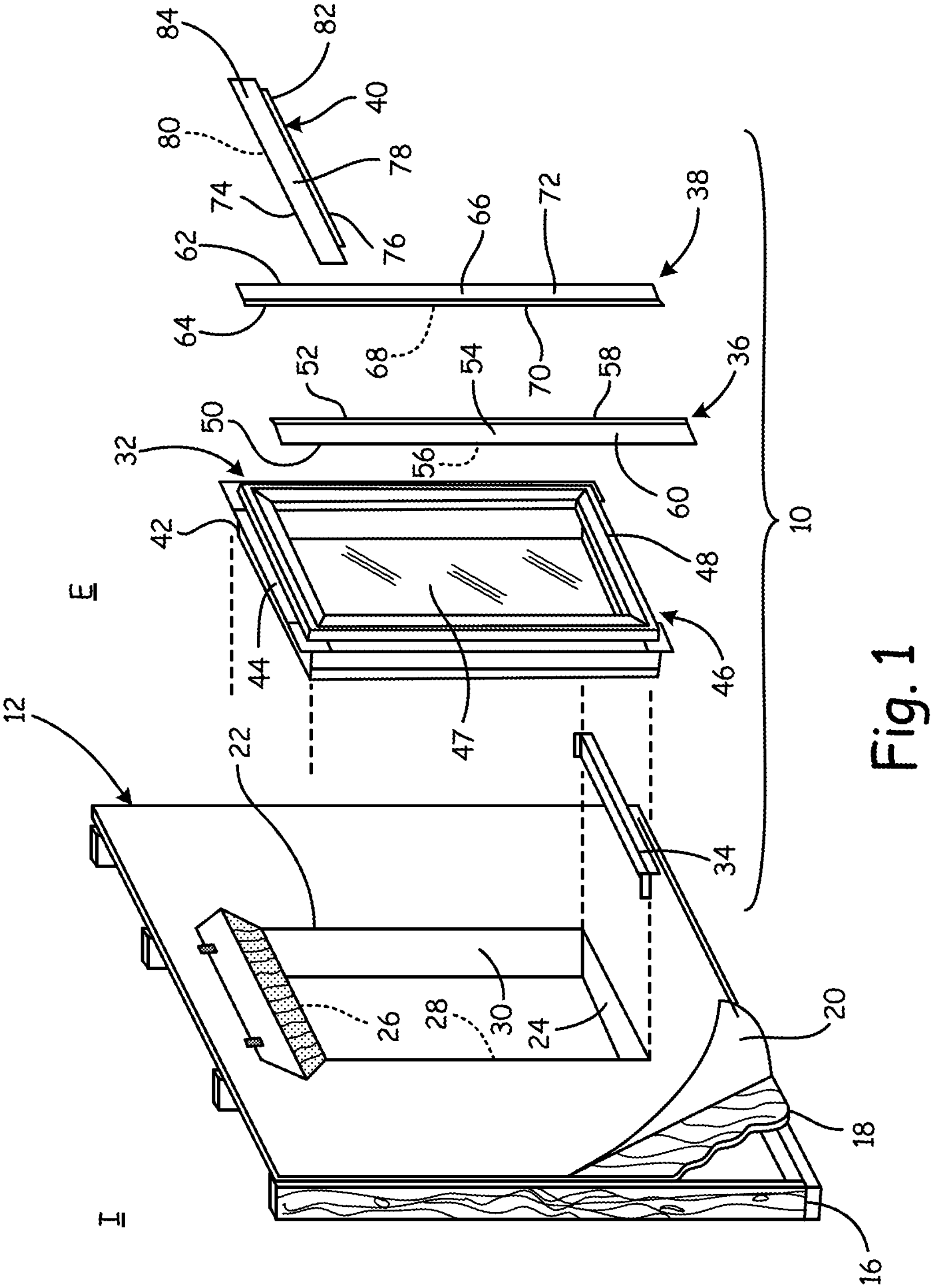
FIG. 1 shows an exploded view of a fenestration product installation in a building structure, according to some embodiments.

FIG. 1 shows an exploded view of fenestration product 10 installed in building structure 12, having exterior side E and interior side I, according to some embodiments. Building structure 12 may include structural framing members 16, sheathing layer 18, and optionally, water barrier layer 20. Building structure 12 may also include rough opening 22 formed by sill 24, head 26 opposite sill 20, first jamb 28, and second jamb 30 opposite first jamb 28. Framing members 16 may be, for example, wooden or steel studs. Sheathing layer 18 may be, for example, oriented strand board or plywood. Water barrier layer 20 may be a film layer or sheet that prevents liquid water from passing through building structure 12 between exterior side E and interior side I.

Framing members 16 may be assembled to form a mechanical support for building structure 12. Sill 24, head 26, first jamb 28 and second jamb 30 may be attached to framing members 16, and to each other by, for example nails, screws, and/or other mechanical fastening means, to form rough opening 22. Sheathing layer 18 may be attached to a side of framing members 16, sill 24, head 26, first jamb 28, and second jamb 30 facing exterior E by, for example, nails, screws and/or other mechanical fastening means. Water barrier layer 20 may cover a side of sheathing layer 18 that faces exterior E by, for example, nails, staples, brads, screws, and/or an adhesive. Building structure 12 may optionally include additional water barrier layers (not shown) and/or sheathing layers (not shown) attached to a side of framing members 16, sill 24, head 26, first jamb 28, and second jamb 30 facing interior I.

As also shown in FIG. 1, fenestration product 10 includes fenestration unit 32, sill flashing 34, first jamb flashing tape 36, second jamb flashing tape 38, and head flashing tape 40. Fenestration unit 32 may include frame 42, nailing fin 44, and sash assembly 46. Nailing fin 44 projects beyond frame 42. Sash assembly includes window pane 47 and sash 48. Sash 48 surrounds window pane 47 and connects window pane 47 to frame 42. Sill flashing 34 is described below in reference to FIGS. 4 and 5. First jamb flashing tape 36 may include first edge 50, second edge 52, first surface 54, and second surface 56. Second edge 52 may be opposite from first edge 50. Second surface 56 may be on an opposite side of first jamb flashing tape 36 from first surface 54. First surface 54 and second surface 56 extend between first edge 50 and second edge 52. First surface 54 may include hydrophobic region 58 and hydrophilic region 60. In some embodiments, second surface 54 is at least partially covered by an adhesive to facilitate its installation. Second jamb flashing tape 38 may include first edge 62, second edge 64, first surface 66, and second surface 68. Second edge 64 may be opposite from first edge 62. Second surface 68 may be on an opposite side of second jamb flashing tape 38 from first surface 66. First surface 66 and second surface 68 extend between first edge 62 and second edge 64. First surface 66 may include hydrophobic region 70 and hydrophilic region 72. In some embodiments, second surface 68 is at least partially covered by an adhesive to facilitate its installation. Head flashing tape 40 may include first edge 74, second edge 76, first surface 78, and second surface 80. Second edge 76 may be opposite from first edge 74. Second surface 78 may be on an opposite side of head flashing tape 40 from first surface 78. First surface 78 and second surface 80 extend between first edge 74 and second edge 76. First surface 78 may include hydrophobic region 82 and hydrophilic region 84. In some embodiments, second surface 80 is at least partially covered by an adhesive to facilitate its installation.

First jamb flashing tape 36, second jamb flashing tape 38, and head flashing tape 40 may be me made of any sturdy, flexible material, such as paper, polymer, polymer-coated paper, or composite materials containing embedded fibers. First jamb flashing tape 36, second jamb flashing tape 38, and head flashing tape 40 may be selectively coated, as described below, to create adjacent hydrophobic and hydrophilic regions, as described above.

Sill flashing 34 may be installed into rough opening 22 on top of sill 24. Sill flashing 34 may be secured to sill 24 by, for example, nails, screws, adhesives and/or other mechanical means. Frame 42 may fit within rough opening 22 and over at least a portion of sill flashing 34 such that at least a portion of nailing fin 44 may be disposed on a side of sheathing layer 18 facing exterior side E, or on a side of water barrier layer 20 facing exterior side E if water barrier layer 20 is employed. Nailing fin 44 may be connected to sill 24, head 26, first jamb 28, and second jamb 30 through sheathing layer 18 by, for example, nails, screws, and/or other mechanical means, to secure fenestration unit 32 to building structure 12.

First jamb flashing tape 36 may cover at least a portion of nailing fin 44 connected to first jamb 28, and cover a portion of sheathing layer 18 (or optionally, water barrier layer 20) adjacent to, but not covered by, nailing fin 44. First jamb flashing tape 36 may extend beyond the upper and lower edges of nailing fin 44. First jamb flashing tape 36 may be disposed such that second surface 56 faces nailing fin 44 and sheathing layer 18 (or optionally, water barrier layer 20), and at least a portion of second edge 52 contacts nailing fin 44. In a similar fashion, second jamb flashing tape 38 may cover at least a portion of nailing fin 44 connected to second jamb 30, and cover a portion of sheathing layer 18 (or optionally, water barrier layer 20) adjacent to, but not covered by, nailing fin 44. Second jamb flashing tape 38 may extend beyond the upper and lower edges of nailing fin 44. Second jamb flashing tape 38 may be disposed such that second surface 68 faces nailing fin 44 and sheathing layer 18 (or optionally, water barrier layer 20), and at least a portion of second edge 64 contacts nailing fin 44. Head flashing tape 40 may cover at least a portion of nailing fin 44 connected to head 26, and covers a portion of sheathing layer 18 (or optionally, water barrier layer 20) adjacent to, but not covered by, nailing fin 44. Head flashing tape 40 may also extend to cover at least portions of first jamb flashing tape 36 and second jamb flashing tape 38 that extend beyond the upper edges of nailing fin 44. Head flashing tape 40 may be disposed such that second surface 80 faces nailing fin 44 and sheathing layer 18 (or optionally, water barrier layer 20), and at least a portion of second edge 84 contacts nailing fin 44. Together, first jamb flashing tape 36, second jamb flashing tape 38, and head flashing tape 40 may seal gaps between nailing fin 44 and sheathing layer 18 (or optionally, water barrier layer 20) to discourage water from flowing around and/or through fenestration product 10 and into building structure 12. In some embodiments, should water penetrate through fenestration unit 32, first jamb flashing tape 36, second jamb flashing tape 38, or head flashing tape 40 of fenestration product 10 and into building structure 12, the water drains into sill flashing 34, and flows out between sill flashing 34 and nailing fin 44.

Figure 2A:
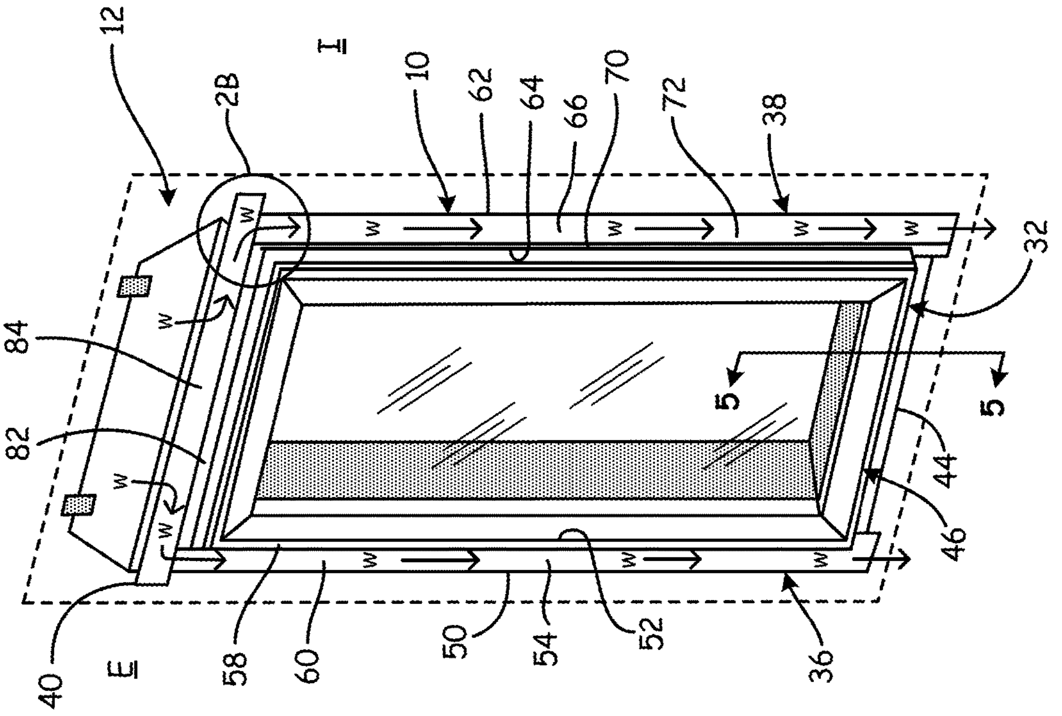
FIGS. 2A and 2B show the fenestration product of FIG. 1 installed in the building structure, according to some embodiments.
Figure 2B:
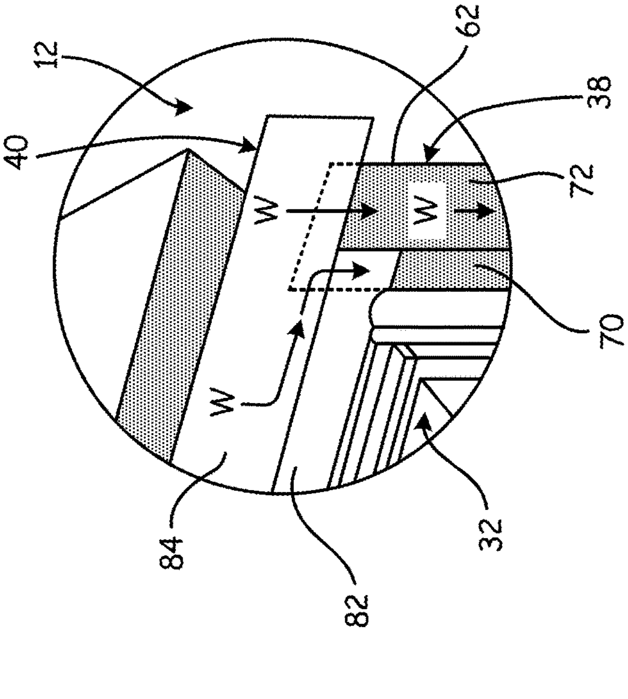

FIGS. 2A and 2B show fenestration product 10 of FIG. 1 installed in building structure 12, according to some embodiments. FIG. 2B is a magnified view of a portion of FIG. 2A. As shown in FIG. 2A, and in greater detail in FIG. 2B, hydrophobic region 82 of head flashing tape 40 does not extend as far as hydrophilic region 84. In some embodiments, hydrophobic region 82 does not extend to first edge 50 of first jamb flashing 36 or to first edge 62 of second jamb flashing 38. In other embodiments, hydrophobic region 82 does not extend beyond hydrophobic region 58 of first jamb flashing 36 or beyond hydrophobic regions 70 of second jamb flashing 38.

Together, hydrophilic regions 60, 72, and 84 may form a continuous hydrophilic path to encourage a flow of water around fenestration unit 32, and hydrophobic regions 58, 70, and 82 may form a continuous hydrophobic barrier between hydrophilic regions 60, 72, and 84 and fenestration unit 32 to discourage water from flowing toward fenestration unit 32. As shown in FIGS. 2A and 2B, water W, either from water depositing directly upon head flashing tape 40, or flowing onto head flashing tape 40 from building structure 12, flows along hydrophilic region 84 and onto hydrophilic region 60 or hydrophilic region 72. Water W flows down hydrophilic region 60 or hydrophilic region 72 and back onto building structure 12 below the lower edge of nailing fin 44. Water W flowing toward hydrophobic regions 58, 70, or 82 may be diverted back to hydrophilic regions 60, 72, and 84, by the hydrophobic character of hydrophobic regions 58, 70, and 82, discouraging water from flowing toward fenestration unit 32. By discouraging water from flowing toward fenestration unit 32, less water may be available to be driven past the flashing into building structure 12 through fenestration product 10 due to pressure differentials between exterior side E and interior side I.

Figure 3:
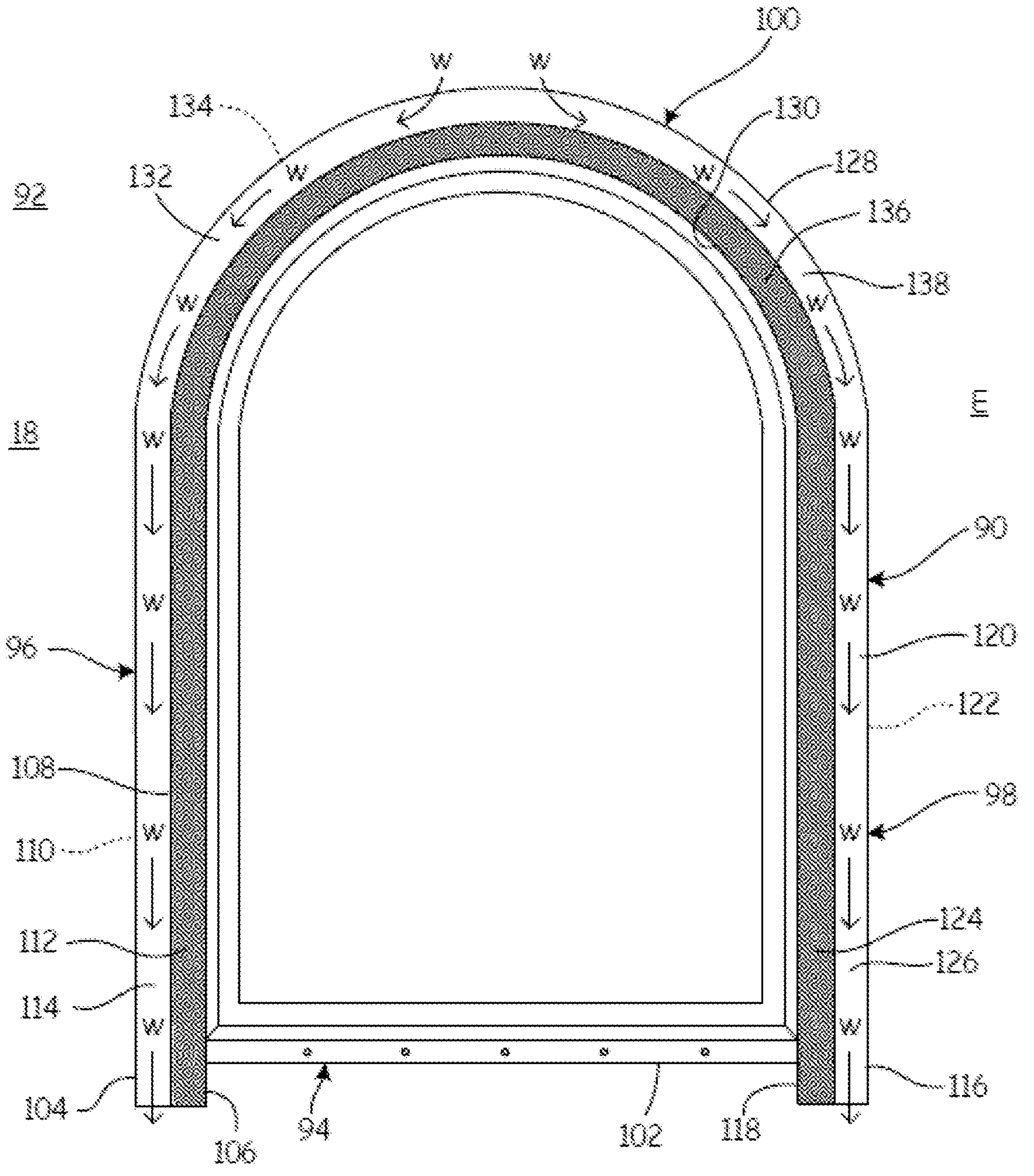
FIG. 3 shows another fenestration product installed in the building structure, according to some embodiments.

FIG. 3 shows fenestration product 90 installed in building structure 92, according to some embodiments. Fenestration product 90 is similar to fenestration product 10 discussed above in reference to FIGS. 1, 2A, and 2B. However, fenestration product 90 has an arched head configuration instead of the rectangular head configuration shown for fenestration product 10.

FIG. 3 shows an exterior side E view of fenestration product 90 installed in building structure 92, according to some embodiments. Building structure 92 is similar to building structure 12 described above, and may include sheathing layer 18, and optionally, water barrier layer 20 (not shown). Fenestration product 90 may include fenestration unit 94, first jamb flashing tape 96, second jamb flashing tape 98, and head flashing tape 100. Fenestration unit 94 may include nailing fin 102. Nailing fin 102 may extend around the periphery of fenestration unit 94 (only the uncovered portion at the bottom of fenestration unit 94 is shown). Nailing fin 102 may secure fenestration unit 94 to building structure 92.

First jamb flashing tape 96 may include first edge 104, second edge 106, first surface 108, and second surface 110. Second edge 106 may be opposite from first edge 104. Second surface 110 may be on an opposite side of first jamb flashing tape 96 from first surface 108. First surface 108 and second surface 110 extend between first edge 104 and second edge 106. First surface 108 may include hydrophobic region 112 and hydrophilic region 114. In some embodiments, second surface 110 is at least partially covered by an adhesive to facilitate its installation. Second jamb flashing tape 98 may include first edge 116, second edge 118, first surface 120, and second surface 122. Second edge 118 may be opposite from first edge 116. Second surface 122 may be on an opposite side of second jamb flashing tape 98 from first surface 120. First surface 120 and second surface 122 extend between first edge 116 and second edge 118. First surface 110 may include hydrophobic region 124 and hydrophilic region 126. In some embodiments, second surface 122 is at least partially covered by an adhesive to facilitate its installation. Head flashing tape 100 may include first edge 128, second edge 130, first surface 132, and second surface 134. Second edge 130 may be opposite from first edge 128. Head flashing tape 100 may be arched such that first edge 128 and second edge 130 are generally concentric. Second surface 134 may be on an opposite side of head flashing tape 100 from first surface 132. First surface 132 and second surface 134 extend between first edge 128 and second edge 130. First surface 132 may include hydrophobic region 136 and hydrophilic region 138. In some embodiments, second surface 134 is at least partially covered by an adhesive to facilitate its installation.

First jamb flashing tape 96 may cover at least a portion of nailing fin 100 along a straight, vertical section of nailing fin 100, and a portion of sheathing layer 18 adjacent to, but not covered by, nailing fin 100. First jamb flashing tape 96 may be disposed such that second surface 110 faces nailing fin 100 and sheathing layer 18, and at least a portion of second edge 106 contacts nailing fin 100. In some embodiments, first jamb flashing tape 96 may be adhered to nailing fin 100 and sheathing layer 18 by adhesive on second surface 110. Second jamb flashing tape 98 may cover at least a portion of nailing fin 100 along another straight vertical section of nailing fin 100 on an opposite side of fenestration unit 94 from first jamb flashing tape 96. Second jamb flashing tape 98 may be disposed such that second surface 122 faces nailing fin 100 and sheathing layer 18, and at least a portion of second edge 118 contacts nailing fin 100. In some embodiments, second jamb flashing tape 98 is adhered to nailing fin 100 and sheathing layer 18 by adhesive on second surface 122. Each of first jamb flashing tape 96 and second jamb flashing tape 98 may extend beyond the lower edges of nailing fin 100.

Head flashing tape 100 may cover at least a portion of nailing fin 100 that arches across the top of fenestration unit 94, and cover a portion of sheathing layer 18 adjacent to, but not covered by, nailing fin 100. Head flashing tape 100 may also extend along the straight, vertical sections of nailing fin 100 to cover at least portions of first jamb flashing tape 96 and second jamb flashing tape 98. Head flashing tape 100 may be disposed such that second surface 134 faces nailing fin 100 and sheathing layer 18, and at least a portion of second edge 130 contacts nailing fin 100. Together, first jamb flashing tape 96, second jamb flashing tape 98, and head flashing tape 100 may seal gaps between nailing fin 100 and sheathing layer 18 to discourage water from flowing around and/or through fenestration product 90 and into building structure 92.

As shown in FIG. 3, hydrophilic regions 114, 126, and 138 may form a continuous hydrophilic path to encourage a flow of water around fenestration unit 94, and hydrophobic regions 112, 124, and 136 may form a continuous hydrophobic barrier between hydrophilic regions 114, 126, and 138 and fenestration unit 94 to discourage water from flowing toward fenestration unit 94. As shown in FIG. 3, water W, either from water depositing directly upon head flashing tape 100, or flowing onto head flashing tape 100 from sheathing layer 18, flows along hydrophilic region 138 and onto hydrophilic region 114 or hydrophilic region 126. Water W flows down hydrophilic region 114 or hydrophilic region 126 and back onto sheathing layer 18 of building structure 92 below the lower edge of nailing fin 100. Water W flowing toward hydrophobic regions 112, 124, and 136 may be diverted back to hydrophilic regions 114, 126, and 138, by the hydrophobic character of hydrophobic regions 112, 124, and 136, discouraging water from flowing toward fenestration unit 94. By discouraging water from flowing toward fenestration unit 94, less water is available to be driven past the flashing into building structure 92 through fenestration product 90 due to pressure differentials between exterior side E and interior side I.

Figure 4:
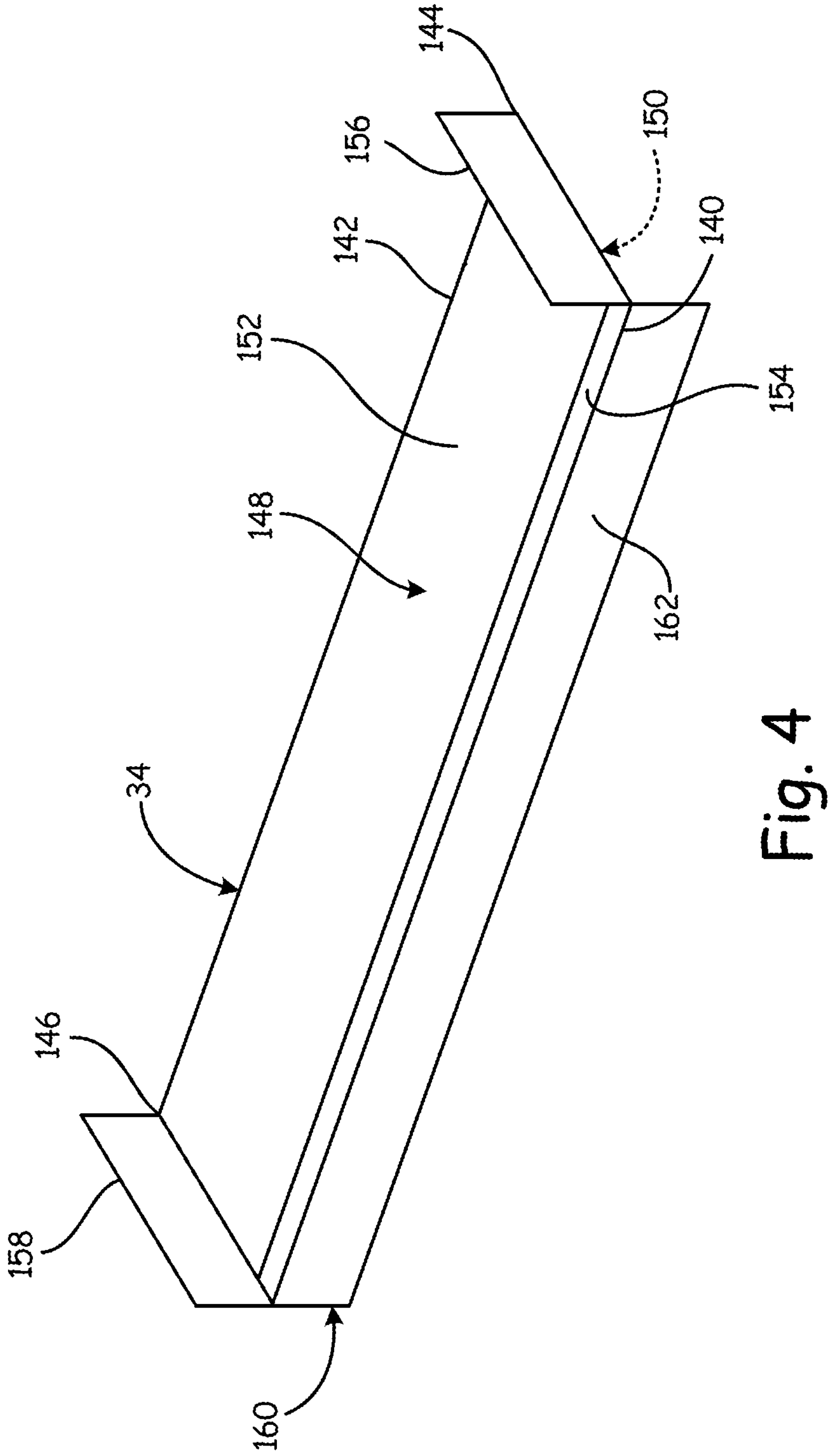
FIG. 4 shows a fenestration flashing FIG. 1, according to some embodiments.

FIG. 4 shows sill flashing 34 of FIG. 1, according to some embodiments. As shown in FIG. 4, sill flashing 34 may include first edge 140, second edge 142, first end 144, second end 146, first surface 148, and second surface 150. Second edge 142 may be opposite from first edge 140. Second end 146 may be opposite from first end 144. Second surface 150 may be on an opposite side of sill flashing 34 from first surface 148. First surface 148 and second surface 150 extend between first edge 140 and second edge 142, and between first end 144 and second end 146. First surface 148 may include hydrophobic region 152 and hydrophilic region 154. Sill flashing 34 may also include first end dam 156 projecting from first surface 148 at first end 144, and second end dam 158 projecting from first surface 148 at second end 146. In some embodiments, sill flashing 34 may also include first integral flange 160 projecting from first edge 140. First integral flange 160 may also include hydrophilic region 162 which may be continuous with, and an extension of, hydrophilic region 154.

Sill flashing 34 may be made of metal, such as steel, stainless steel, aluminum, etc., or non-metals, such as polymers or composite materials. In some embodiments, second surface 150 may be at least partially covered by an adhesive to facilitate its installation. Sill flashing 34 may also be referred to as a sill pan.

Figure 5:
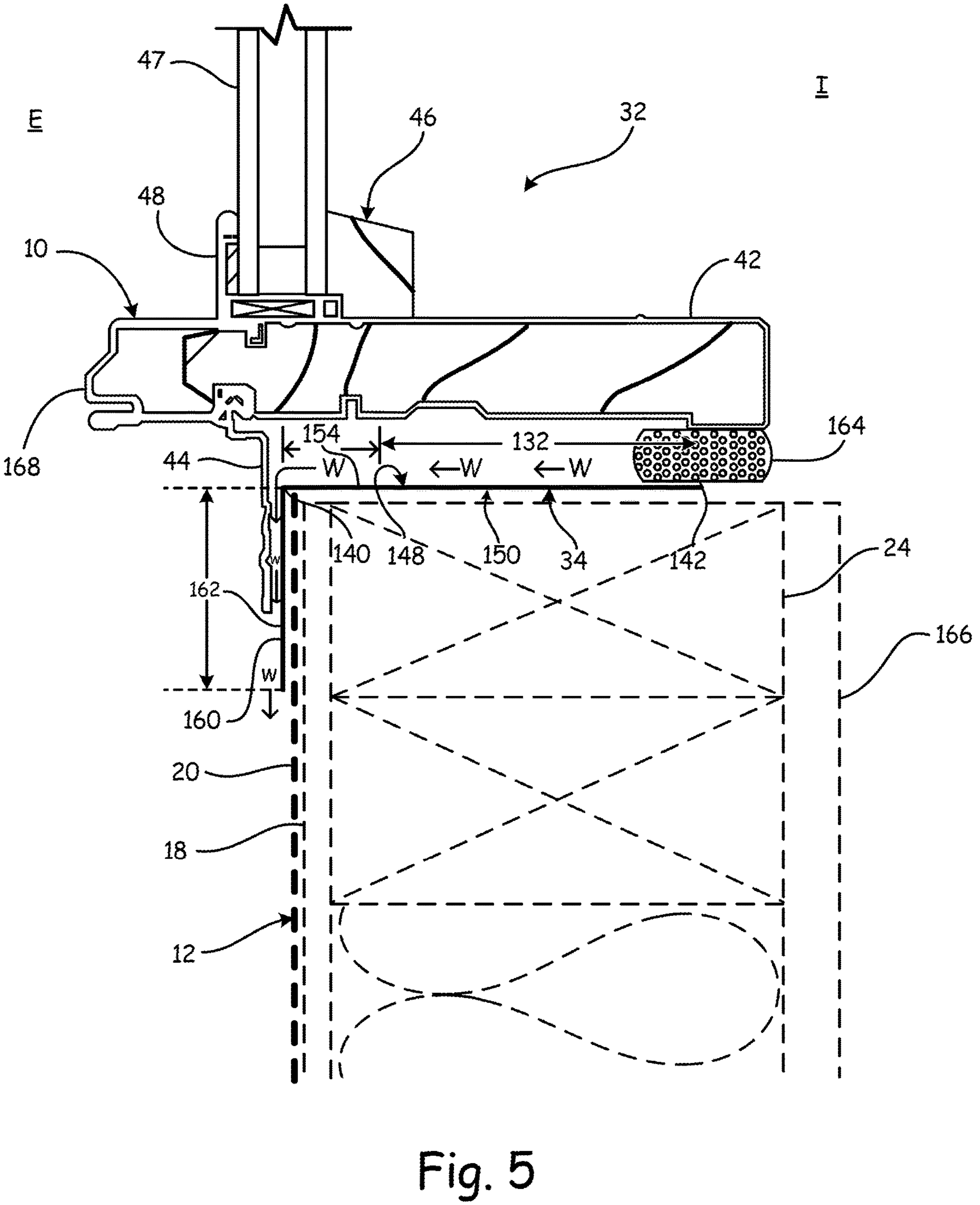
FIG. 5 is a sectional view the installed fenestration product of FIG. 1, according to some embodiments.

FIG. 5 is a sectional view of fenestration product 10 installed in building structure 12 as shown in FIGS. 1 and 2A, including sill flashing 34 as shown in FIG. 4, according to some embodiments. Like numbers denote the same feature as describe in reference to FIGS. 1, 2A, and 4. As shown in FIG. 5, fenestration product 10 may further include interior seal 164, building structure 12 may further include interior sheathing layer 166, and fenestration unit 32 may further include cladding 168. Interior seal 164 may seal a gap between frame 42 and sill 24 at interior side I to discourage water and air from passing between exterior side E and interior side I. Cladding 168 may cover a portion of frame 42 and sash 48 for purposes of appearance and/or environmental protection.

As noted above in reference to FIG. 1, in some embodiments, should water penetrate through fenestration unit 32, first jamb flashing tape 36, second jamb flashing tape 38, or head flashing tape 40 of fenestration product 10 and into building structure 12, the water properly drains into sill flashing 34, and flows out between sill flashing 34 and nailing fin 44. However, over time, interior seal 164 may fail or installation and/or flashing defects may occur so that the water that collects in sill flashing 34 proximate interior seal 164 may flow into interior side I of building structure 12. As shown FIG. 5, hydrophobic region 152 of sill flashing 34 discourages water that may flow into sill flashing 34 from remaining near interior seal 164. A flow of water W is diverted by hydrophobic region 152 toward hydrophilic region 154 and away from interior seal 164 by the hydrophobic character of hydrophobic region 152, discouraging water from flowing toward interior side I. In some embodiments, the flow of water W continues around first edge 140 to hydrophilic region 162 (as it may be continuous with hydrophilic region 154) and down along first integral flange 160 and on to water barrier layer 20 of building structure 12 below the lower edge of nailing fin 44.

In some embodiments, sill flashing 34 may be disposed such that first edge 140 is lower than second edge 142. This outward slope may serve to enhance the diversion of water by hydrophobic region 152 toward hydrophilic region 154. In other embodiments, sill flashing 34 may be disposed such that first edge 140 is higher than second edge 142. This inward slope may occur, for example, should building structure 12 shift over time such that sill 24 slopes inward, shifting sill flashing 34 along with it. In such embodiments, sill flashing 34 may resist an inward flow of water where hydrophobic region 152 meets hydrophilic region 154 due to the hydrophobic nature of hydrophobic region 152.

Figure 6:
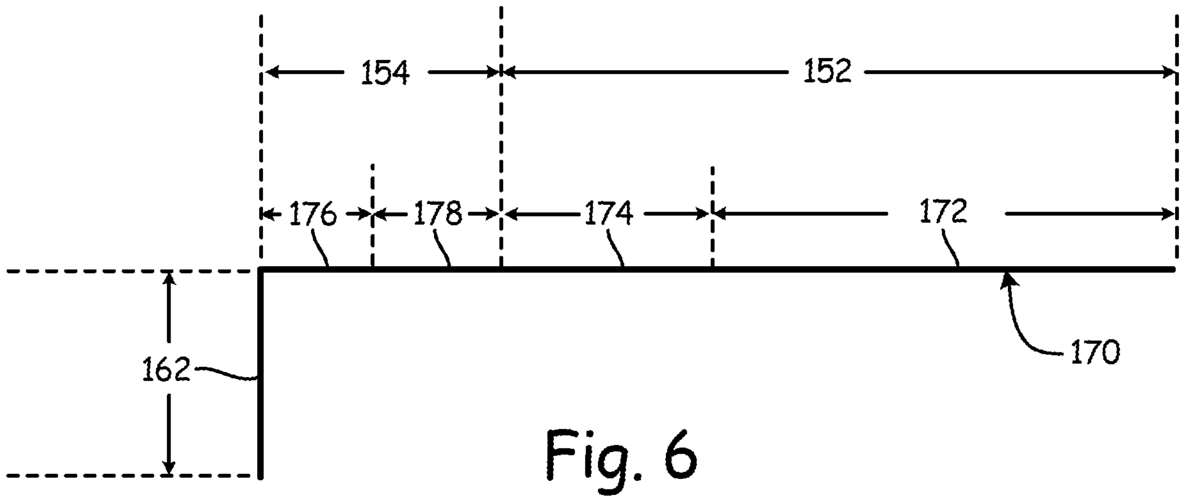
FIG. 6 is a schematic sectional view a fenestration flashing, according to some embodiments.

FIG. 6 is a schematic sectional view sill flashing 170 including a graded transition from hydrophobic to hydrophilic, according to some embodiments. Sill flashing 170 is identical to sill flashing 34, except that hydrophobic region 152 further includes first hydrophobic portion 172 and second hydrophobic portion 174. In some embodiments, first hydrophobic portion 172 is remote from hydrophilic region 154, and second hydrophobic portion 174 is between first hydrophobic portion 172 and hydrophilic region 154, as shown in FIG. 6. First hydrophobic portion 172 is characterized by a first hydrophobic contact angle, and second hydrophobic portion 174 is characterized by a second hydrophobic contact angle which is less than the first hydrophobic contact angle. In some embodiments, the first hydrophobic contact angle is greater than 150 degrees.

In some embodiments, sill flashing 170 may also include first hydrophilic portion 176 and second hydrophilic portion 178. First hydrophilic portion 176 may be remote from hydrophobic region 152, and second hydrophilic portion 178 may be between first hydrophilic portion 176 and hydrophobic region 152, as also shown in FIG. 6. First hydrophilic portion 176 is characterized by a first hydrophilic contact angle, and second hydrophilic portion 178 is characterized by a second hydrophilic contact angle which is greater than the first hydrophilic contact angle. In some embodiments, the first hydrophilic contact angle is about 0 degrees. The graded transition from hydrophobic to hydrophilic as shown in FIG. 6 may further promote the flow of water W from hydrophobic region 152 toward hydrophilic region 154, in some embodiments.

Figure 7:
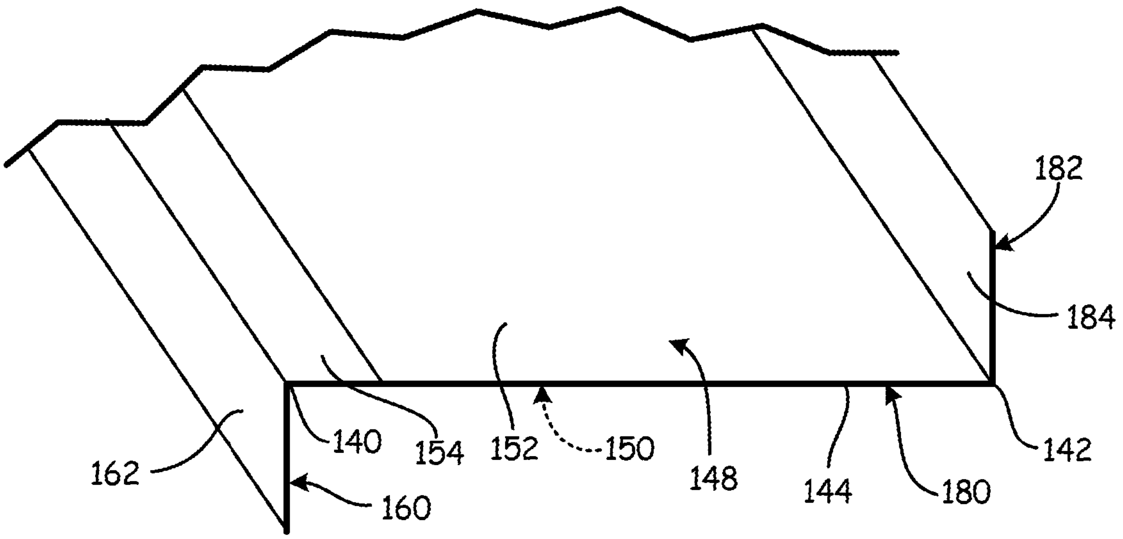
FIG. 7 a perspective view of another fenestration flashing, according to some embodiments.

FIG. 7 is a perspective view of another sill flashing, according to some embodiments. FIG. 7 shows a portion of sill flashing 180. Sill flashing 180 is identical to sill flashing 34, except that sill flashing 180 may include second integral flange 182 projecting from second edge 142. End dam 156 is omitted for clarity. Second integral flange 182 may also include hydrophobic region 184 which may be continuous with, and an extension of, hydrophobic region 152. As with sill flashing 34, second surface 150 of sill flashing 180 may be at least partially covered by an adhesive to facilitate its installation. In some embodiments, sill flashing 180 may further include the graded transition from hydrophobic to hydrophilic as described above in reference to FIG. 6 for sill flashing 170 to further promote the flow of water W is from hydrophobic region 152 toward hydrophilic region 154.

Figure 8:
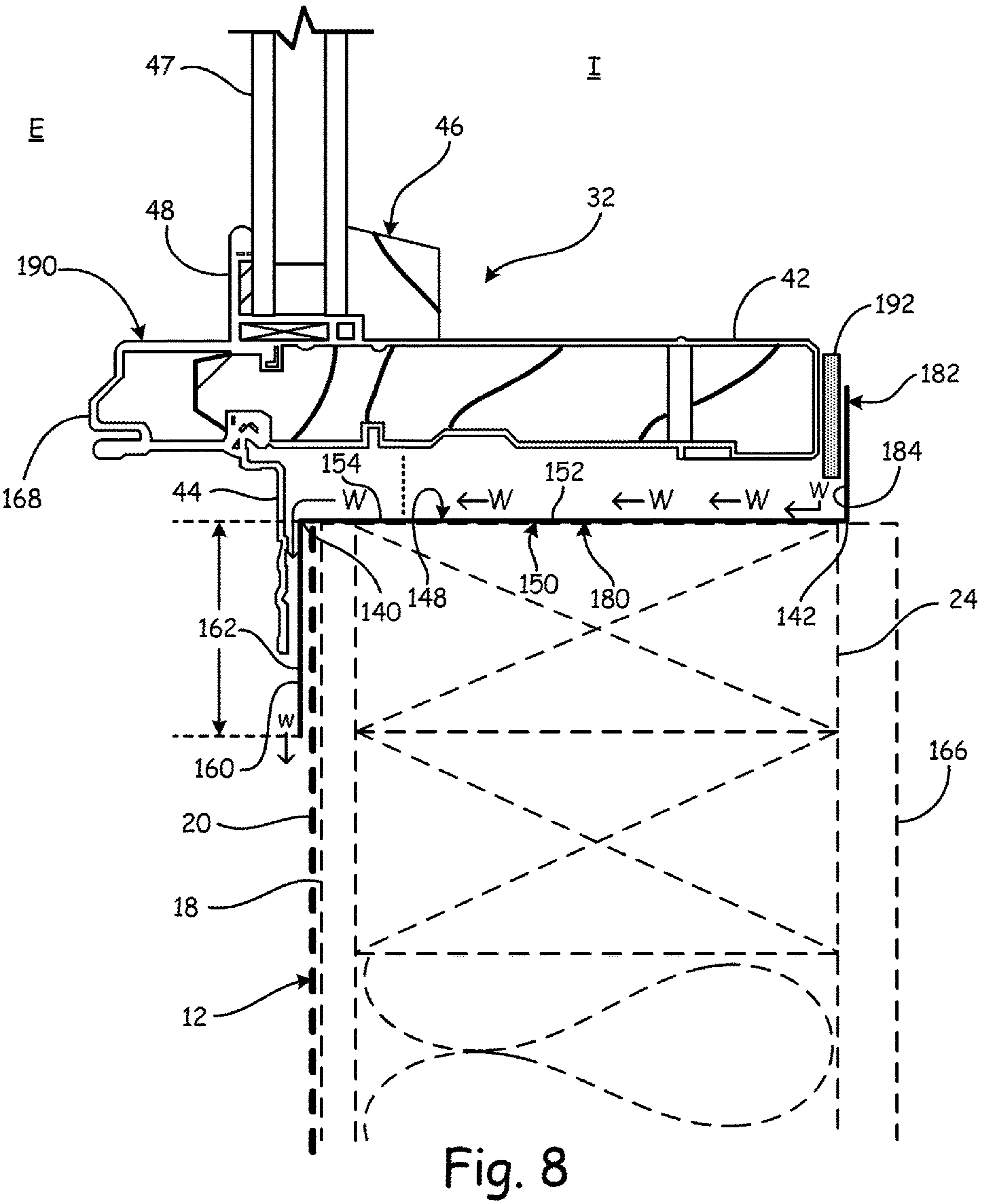
FIG. 8 is a sectional view of an installed fenestration product, according to some embodiments.

FIG. 8 is a sectional view of fenestration product 190 installed in building structure 12, according to some embodiments. Fenestration product 190 is identical to fenestration product 10 as described above in reference to FIGS. 1, 2A, 2B, and 5, except that sill flashing 180, as described above in reference to FIG. 7, replaces sill flashing 34, and interior seal 192 replaces interior seal 164. Like numbers denote the same feature as described above. As shown in FIG. 8, second integral flange 182 may provide an additional barrier to a flow of water W into interior side I. Interior seal 192 may seal a gap between frame 42 and second integral flange 182 at interior side I to discourage water and air from passing between exterior side E and interior side I.

As shown FIG. 8, hydrophobic region 184 of second integral flange 182 discourages water that may flow into sill flashing 180 from remaining near interior seal 192. A flow of water W is diverted by hydrophobic region 184 and past second edge 142 to hydrophobic region 152 (as the two regions may be continuous) and toward hydrophilic region 154. In some embodiments, the flow of water W continues around first edge 140 to hydrophilic region 162 (as it may be continuous with hydrophilic region 154) and down along first integral flange 160 and on to water barrier layer 20 of building structure 12 below the lower edge of nailing fin 44. Second integral flange 182 including hydrophobic region 184 as a continuous extension of hydrophobic region 152 may further discourage water from passing from exterior side E to interior side I.

Fenestration unit 32 is illustrated in FIGS. 1, 2A, 2B, 5, and 8 as a fixed window unit. However, it is understood that fenestration unit 32 may be an awning window unit, a casement window unit, a single-hung window unit, a double hung window unit, or any other type of window, in some embodiments.

Figure 9:
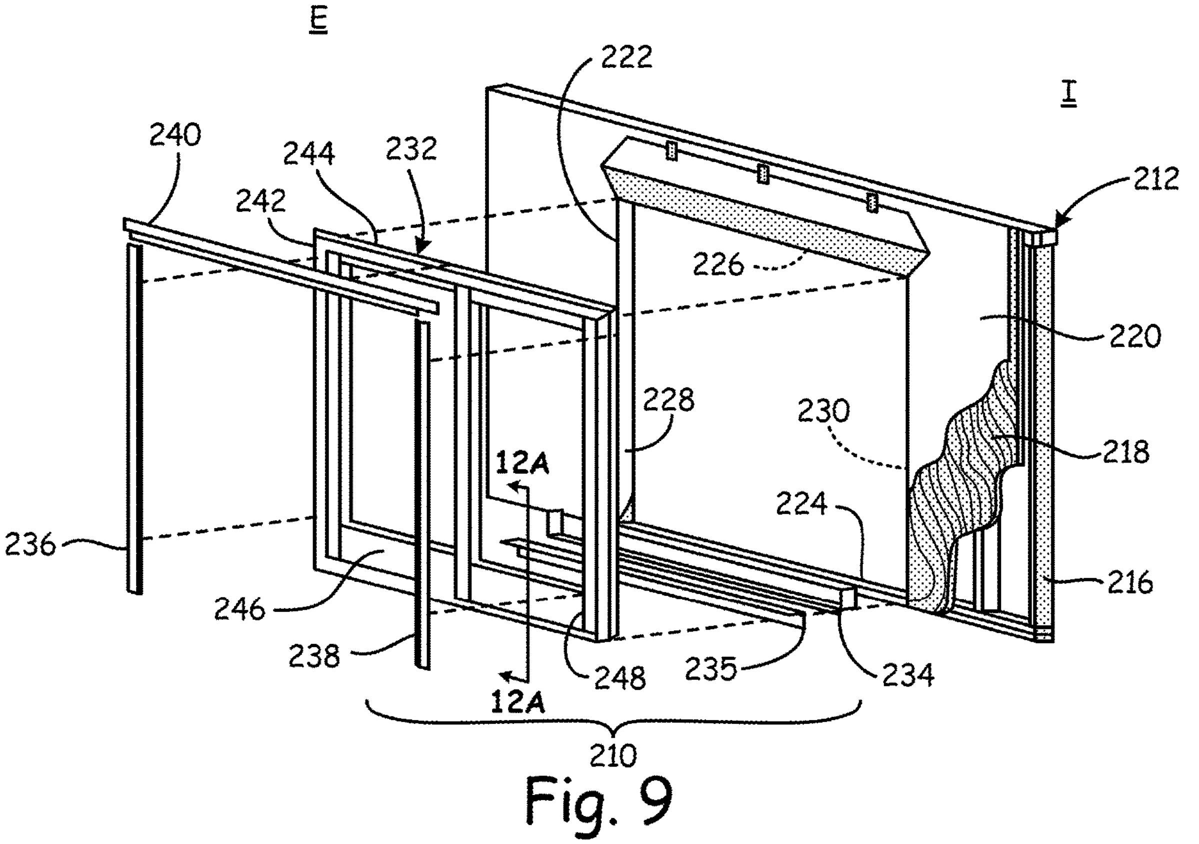
FIG. 9 shows an exploded view of another fenestration product installed in a rough opening in a building structure, according to some embodiments.

FIG. 9 shows an exploded view of fenestration product 210 installed in building structure 212, having exterior side E and interior side I, according to some embodiments. Building structure 212 may include structural framing members 216, sheathing layer 218, and optionally, water barrier layer 220. Building structure 212 may also include rough opening 222 formed by sill 224, head 226 opposite sill 220, first jamb 228, and second jamb 230 opposite first jamb 228. All elements of building structure 212 may be as described above in reference to FIG. 1 for comparable elements.

As also shown in FIG. 9, fenestration product 210 includes fenestration unit 232, sill flashing tape 234, sill support 235, first jamb flashing tape 236, second jamb flashing tape 238, and head flashing tape 240, according to some embodiments. Fenestration unit 232 maybe, for example, a sliding patio door unit. Fenestration unit 232 may include frame 242, nailing fin 244, stationary panel 246, and sliding panel 248. Stationary panel 246 is fixedly secured to frame 242, in some embodiments. Sliding panel 248 may be moveable, sliding along sill track 272 (FIGS. 12A and 12B). Sill flashing tape 234 and sill support 235 are described below in reference to FIGS. 10, 11, 12A and 12B.

First jamb flashing tape 236, second jamb flashing tape 238, and head flashing tape 240 are identical in form and function to comparable elements as described above in reference to FIGS. 1, 2A, and 2B, varying only in length to accommodate any dimensional differences between fenestration unit 32 and fenestration unit 232.

Sill flashing tape 234 may be installed into rough opening 222 on top of sill 224, and sill support 235 may be secured to exterior side E of building structure 212 and below rough opening 222, as described below in reference to FIGS. 10, 11, and 12. Frame 242 may fit within rough opening 222 and over at least a portion of sill flashing tape 234 and sill support 235 such that at least a portion of nailing fin 244 may be disposed on a side of sheathing layer 218 facing exterior side E, or on a side of water barrier layer 220 facing exterior side E if water barrier layer 220 is employed. Nailing fin 244 may be connected to sill 224, head 226, first jamb 228, and second jamb 230 through sheathing layer 218 by, for example, nails, screws, and/or other mechanical means, to secure fenestration unit 232 to building structure 212.

First jamb flashing tape 236, second jamb flashing tape 238, and head flashing tape 240 may seal gaps between nailing fin 244 and sheathing layer 218 (or optionally, water barrier layer 220) to discourage water from flowing around and/or through fenestration product 210 and into building structure 212. In addition, because first jamb flashing tape 236, second jamb flashing tape 238, and head flashing tape 240 identical in form and function to comparable elements as described above in reference to FIGS. 1, 2A, and 2B, they include hydrophobic and hydrophilic regions that discourage water from flowing toward fenestration unit 232. By discouraging water from flowing toward fenestration unit 232, less water may be available to be driven past the flashing into building structure 212 through fenestration product 210 due to pressure differentials between exterior side E and interior side I.

Figure 10:
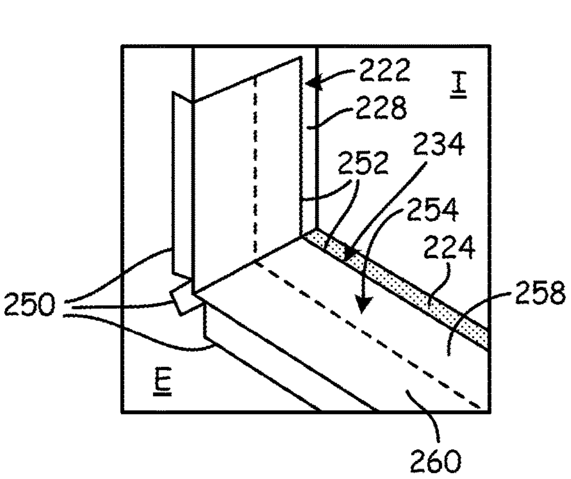
FIG. 10 shows the fenestration flashing of FIG. 9 installed in rough opening, according to some embodiments.

FIG. 10 shows sill flashing tape 234 installed in rough opening 222, according to some embodiments. Prior to installation in rough opening 222, sill flashing tape 234 may include first edge 250, second edge 252, first surface 254, and second surface 256 (not shown). Second edge 252 may be opposite from first edge 250. Second surface 256 may be on an opposite side of sill flashing tape 234 from first surface 254. First surface 254 and second surface 256 extend between first edge 250 and second edge 252. First surface 254 may include hydrophobic region 258 and hydrophilic region 260. In some embodiments, second surface 256 is at least partially covered by an adhesive to secure sill flashing tape 234 within rough opening 222.

As shown in FIG. 10, sill flashing tape 234 may cover at least a portion of sill 224 and extend from sill 224 upward at each end and onto a portion of each of first jamb 228 and second jamb 230, according to some embodiments. Sill flashing tape 234 may be folded such that at least a portion of first edge 250 is disposed onto sheathing layer 218 (or optionally, water barrier layer 220) on exterior side E of building structure 212 just below rough opening 222, and hydrophilic region 260 extends from sill 224, over an edge of sill 224 on exterior side E, to exterior side E, according to some embodiments. In some embodiments, a portion of first edge 250 is disposed onto exterior side E of building structure 212 on either side of rough opening 222 corresponding to the portion of sill flashing tape 234 extending upward at each end and onto a portion of each of first jamb 228 and second jamb 230. In this way, hydrophilic region 260 may also extend from first jamb 228, over an edge of first jamb 228 on exterior side E, to exterior side E; and hydrophilic region 250 may also extend from second jamb 230, over an edge of second jamb 230 on exterior side E, to exterior side E according to some embodiments.

Figure 11:
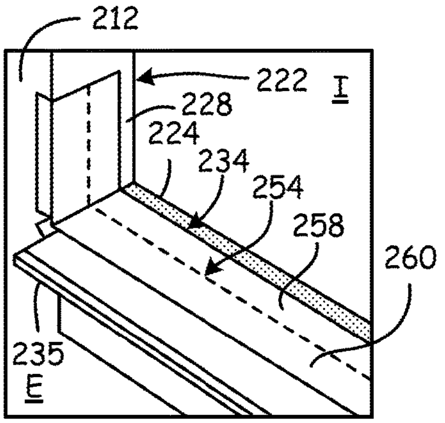
FIG. 11 shows the fenestration flashing of FIG. 9 installed in rough opening, according to some embodiments.
Figure 12A:
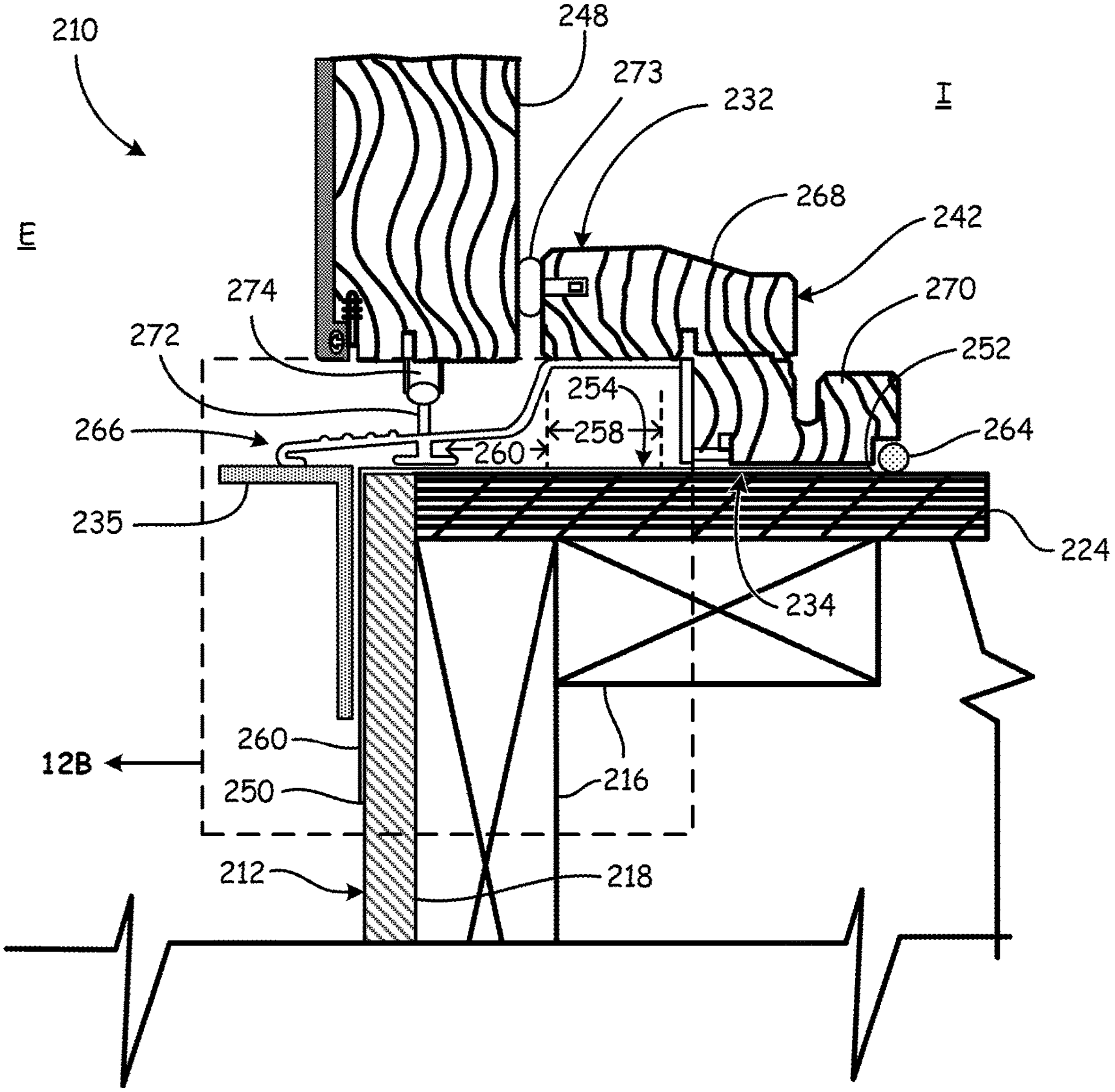
FIGS. 12A and 12 B are sectional views of the installed fenestration product of FIG. 9, according to some embodiments.
Figure 12B:
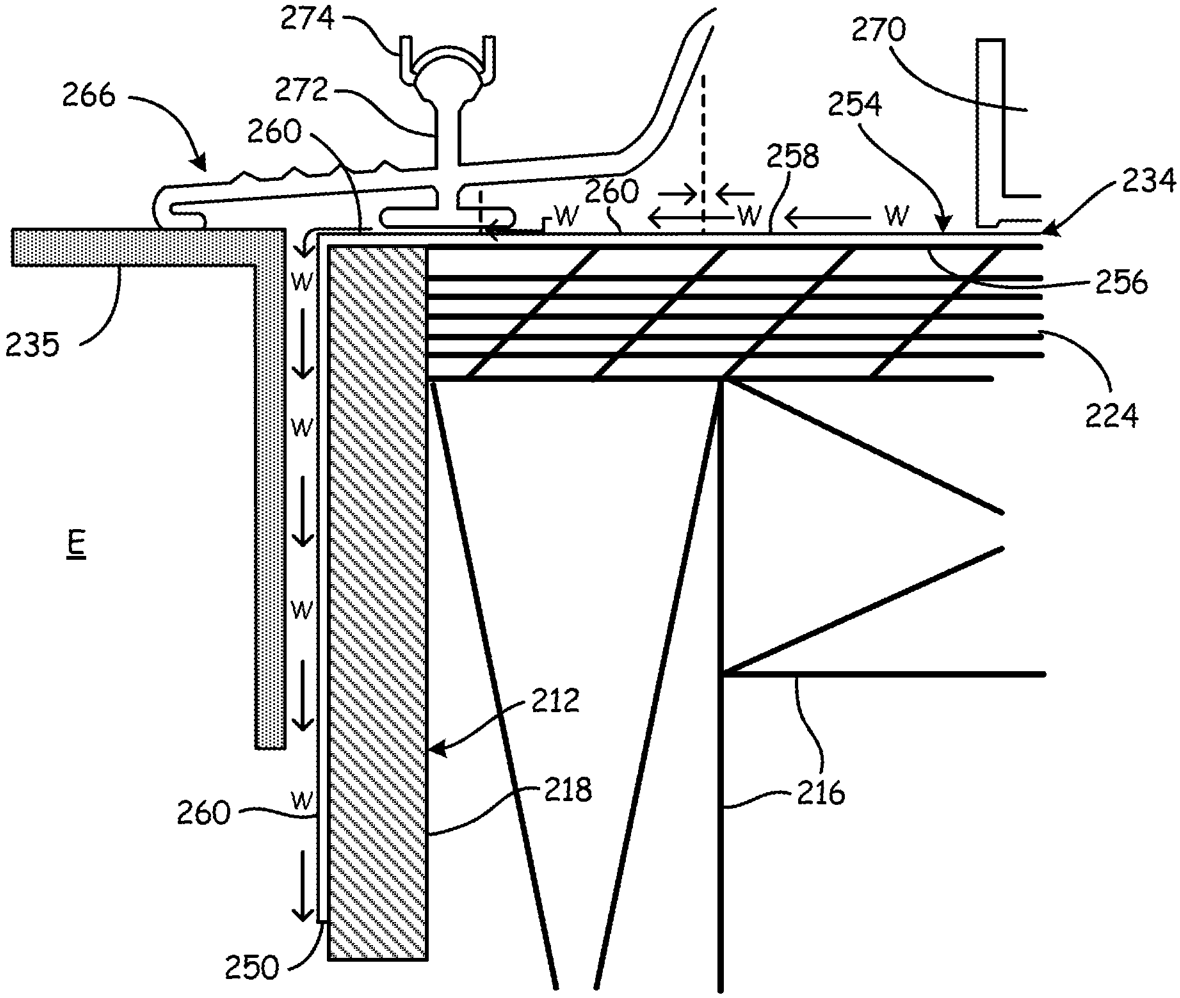

FIG. 11 shows sill support 235 installed on exterior side E just below rough opening 222 following installation of sill flashing tape 234 as describe above in reference to FIG. 10, according to some embodiments. Sill support 235 may be secured to building structure 212 by, for example, nails, screws, adhesives and/or other mechanical means. Sill support 235 covers at least a portion of sill flashing 234 disposed on to exterior side E of building structure 212 just below rough opening 222, according to some embodiments.

FIGS. 12A and 12B are sectional views of fenestration product 210 installed in building structure 212 as shown in FIGS. 9, 10, and 11, including sill flashing tape 234, according to some embodiments. FIG. 12B is a magnified view of a portion of FIG. 12A. Like numbers denote the same elements as described above in reference to FIGS. 9, 10, and 11. As shown in FIG. 12A, fenestration product 210 may further include interior seal 264. Interior seal 264 may seal a gap between fenestration unit 232 and sill 224 at interior side I to discourage water and air from passing between exterior side E and interior side I. As also shown in FIG. 12A, frame 242 may include door sill 266, threshold 268, and foot 270. Door sill 266 may include sill track 272. Threshold 268 may include door seal 273. Threshold 268 and foot 270 are connected to door sill 266 to form the lower part of frame 242. Sliding panel 248 may include rollers 274. Sill track 272 projects up from door sill 266. Rollers 274 project down from sliding panel 248 to engage sill track 272, providing the means for sliding panel 248 to slide horizontally within frame 242, in some embodiments. According to some embodiments, door seal 273 is an elastomeric seal that projects from threshold 268 toward sliding panel 248. Door seal 273 elastically contacts sliding panel 248 as sliding panel 248 moves horizontally within frame 242 to seal a gap between sliding panel 248 and threshold 268, according to some embodiments.

As shown in FIG. 12A, a portion of door sill 266 may be angled downward toward exterior side E to direct water away from fenestration unit 232. In some embodiments, water W may penetrate through fenestration unit 232, sill support 235, first jamb flashing tape 236, second jamb flashing tape 238, or head flashing tape 240 of fenestration product 210, drain under frame 242, and onto sill flashing tape 234. From sill flashing tape 234, the water may flow out between sill flashing tape 234 and sill support 235. However, over time, interior seal 264 may fail or installation and/or flashing defects may occur and the water that collects on sill flashing tape 234 proximate interior seal 264 may flow into interior side I of building structure 212.

As shown FIG. 12B, hydrophobic region 258 of sill flashing tape 234 discourages water that may flow into sill flashing tape 234 from remaining near interior seal 264. A flow of water W is diverted by hydrophobic region 258 toward hydrophilic region 260 by the hydrophobic character of hydrophobic region 258. In some embodiments, the flow of water W continues along hydrophilic region 260, down between sill support 235 and sill flashing tape 234, to first edge 250, and then onto sheathing layer 218 (or optionally, water barrier layer 220) facing exterior side E.

In some embodiments, sill 224 may be angled downward toward exterior side E. This outward slope may serve to enhance the diversion of water by hydrophobic region 258 toward hydrophilic region 260. In other embodiments, sill 224 may be angled downward toward interior side I. This inward slope may occur, for example, should building structure 212 shift over time such that sill 224 slopes inward. In such embodiments, sill flashing tape 234 may resist an inward flow of water where hydrophobic region 258 meets hydrophilic region 260 due to the hydrophobic nature of hydrophobic region 258.

Fenestration unit 210 is illustrated in FIGS. 9, 12A, and 12B as a sliding patio door unit. However, it is understood that embodiments include other door unit styles including, for example, hinged patio doors.

Figure 13:
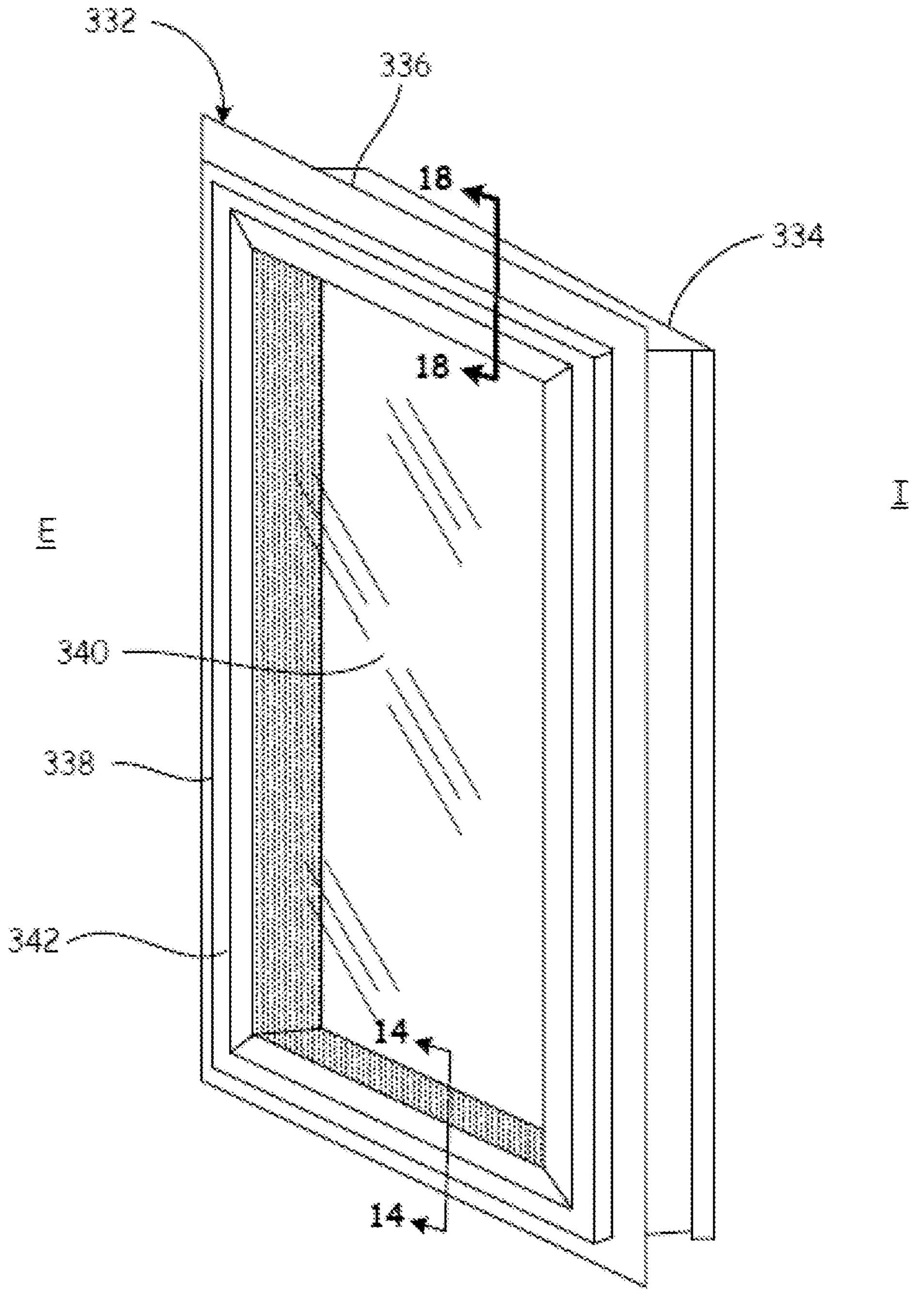
FIG. 13 shows another fenestration product, according to some embodiments.

FIG. 13 shows fenestration unit 332, according to some embodiments. Fenestration unit 332 may be, for example, a casement window. In some embodiments, fenestration unit 332 may be installed as described above for fenestration unit 32 in reference to FIGS. 1, 2A, and 2B. Fenestration unit 332 may include frame 334, nailing fin 336, and sash assembly 338. Nailing fin 336 projects beyond frame 334 for securing fenestration unit 332 to, for example, building structure 12 (FIG. 1). Sash assembly 338 includes window pane 340 and sash 342. Sash 342 surrounds window pane 340 and connects window pane 340 to frame 334 by way of a hinged connection (not shown) to permit sash assembly 338 to be angled between a closed position (shown in FIG. 13) and a range of open positions, as is known in the art for casement windows.

Figure 14A:
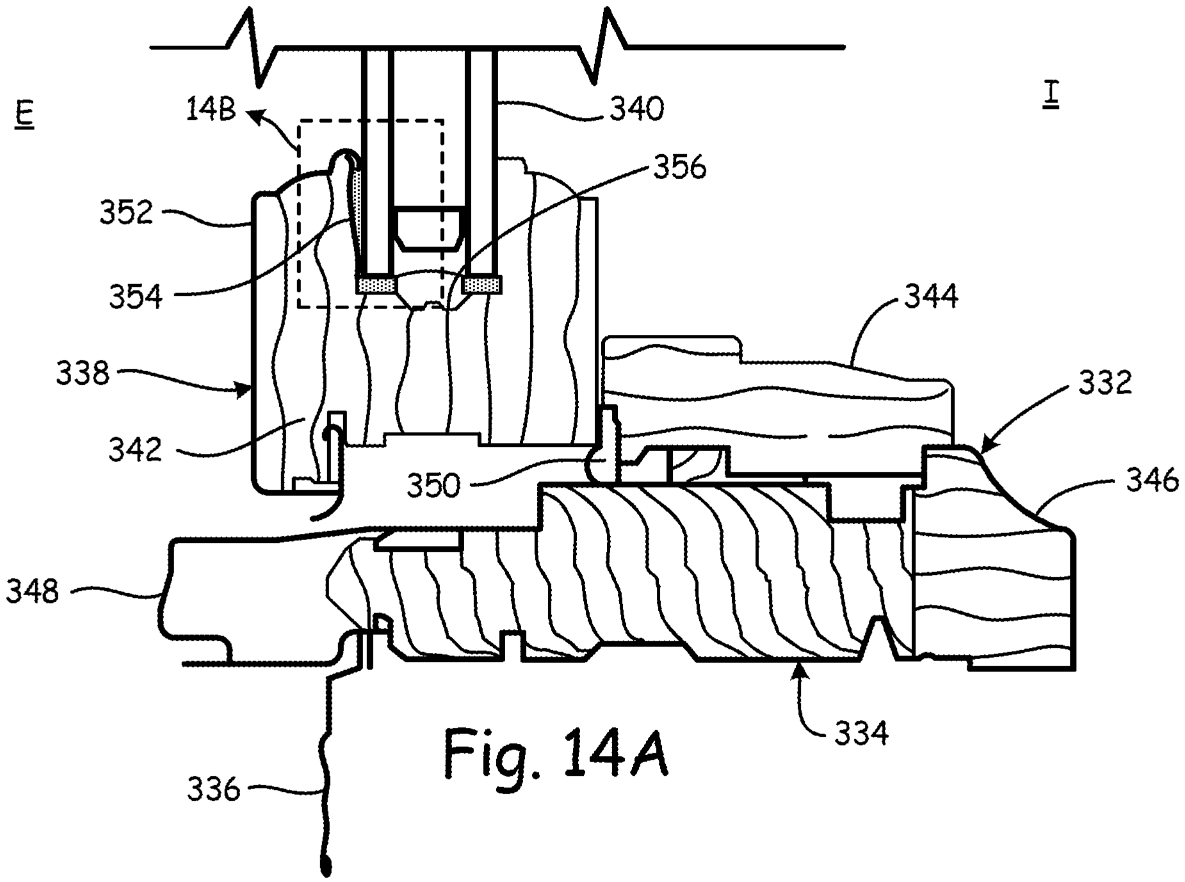
FIGS. 14A and 14B are sectional views of the installed fenestration product of FIG. 13, according to some embodiments.
Figure 14B:
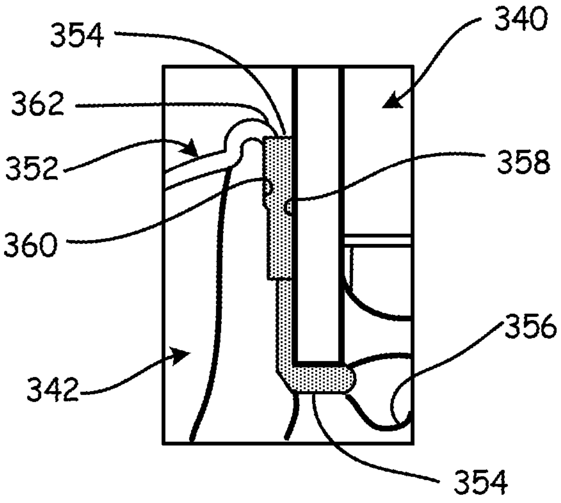

FIGS. 14A and 14B are sectional views of a portion of fenestration unit 332 shown in FIG. 13. FIG. 14B is a magnified view of a portion of FIG. 14A. As shown in FIG. 14A, frame 334 includes inner casement sill 344, outer casement sill 346, frame cladding 348, and casement seal 350, in some embodiments. Sash assembly 338 may further include sash cladding 352, and sash seal 354. Sash 342 may include window pocket 356. Casement seal 350 and sash seal 354 may be, for example, elastomeric seals. As shown in FIG. 14A, frame cladding 348 may be attached to a side of outer casement sill 344 facing exterior side E for purposes of appearance and/or environmental protection. In some embodiments, inner casement sill 344 is disposed on top of outer casement sill 346. Casement seal 350 may connect to, and project from, inner casement sill 344 and toward exterior side E to seal a gap between frame 334 and sash assembly 338 when sash assembly 338 is in a closed position. Inner casement sill 344 includes crank and lever mechanisms (not shown) to control the movement of sash assembly 338 between closed and open positions, in some embodiments.

Figure 15:
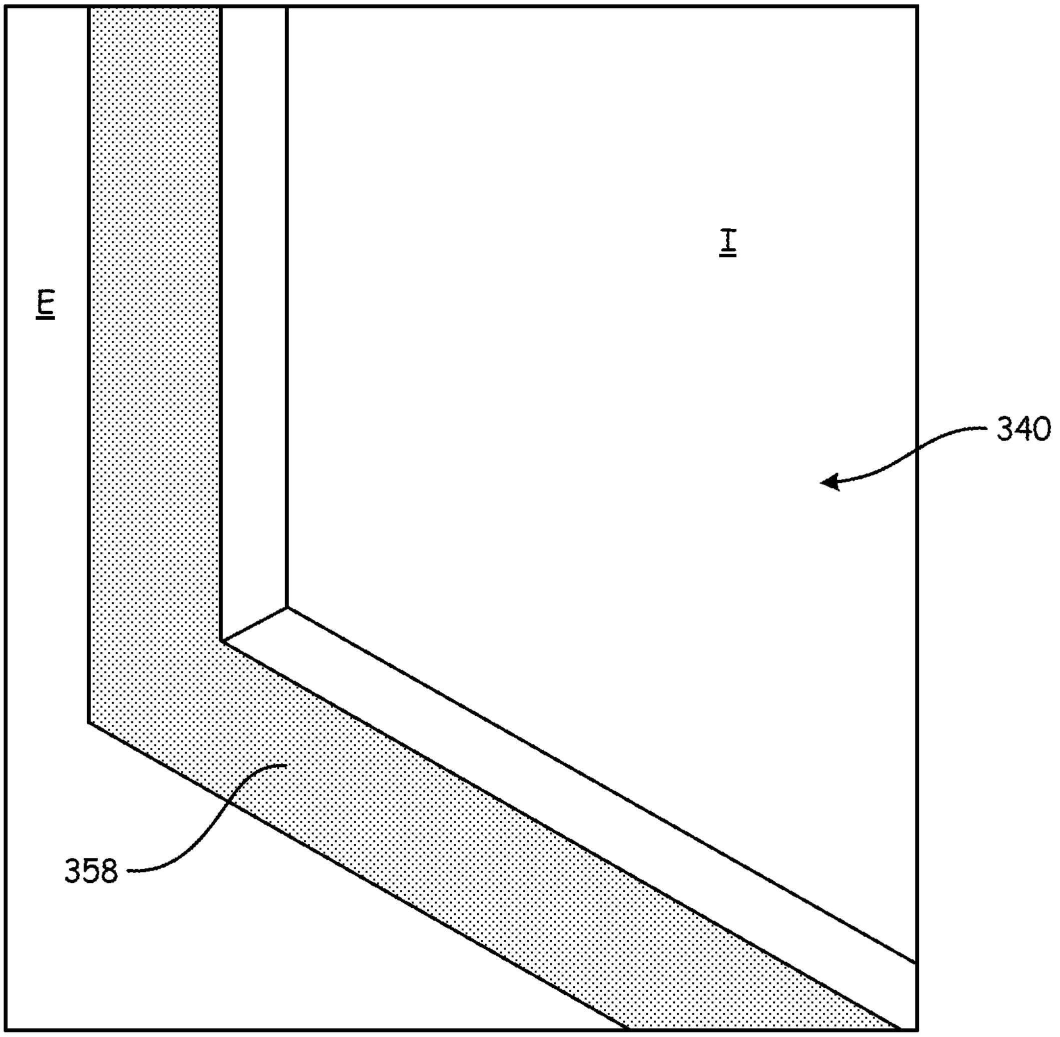
FIG. 15 shows a component of the installed fenestration product of FIGS. 14A and 14B, according to some embodiments.

As further shown in FIGS. 14A and 14B, window pocket 356 may be configured to contain an edge of window pane 340. Window pane 340 may include window pane surface 358. Window pane surface 358 is a side of the edge of window pane 340 configured to face toward exterior side E and be contained within window pocket 356 when window pane 340 is installed in sash 342. FIG. 15 is a perspective view of a portion of window pane 340 illustrating window pane surface 358, according to some embodiments. Window pane surface 358 may be coated with a hydrophobic material, such that window pane surface 358 has a contact angle greater than 90 degrees. Alternatively, window pane 340 may be made of a material that is inherently hydrophobic, thus assuring that window pane surface 359 has a contact angle greater than 90 degrees.

Figure 16:
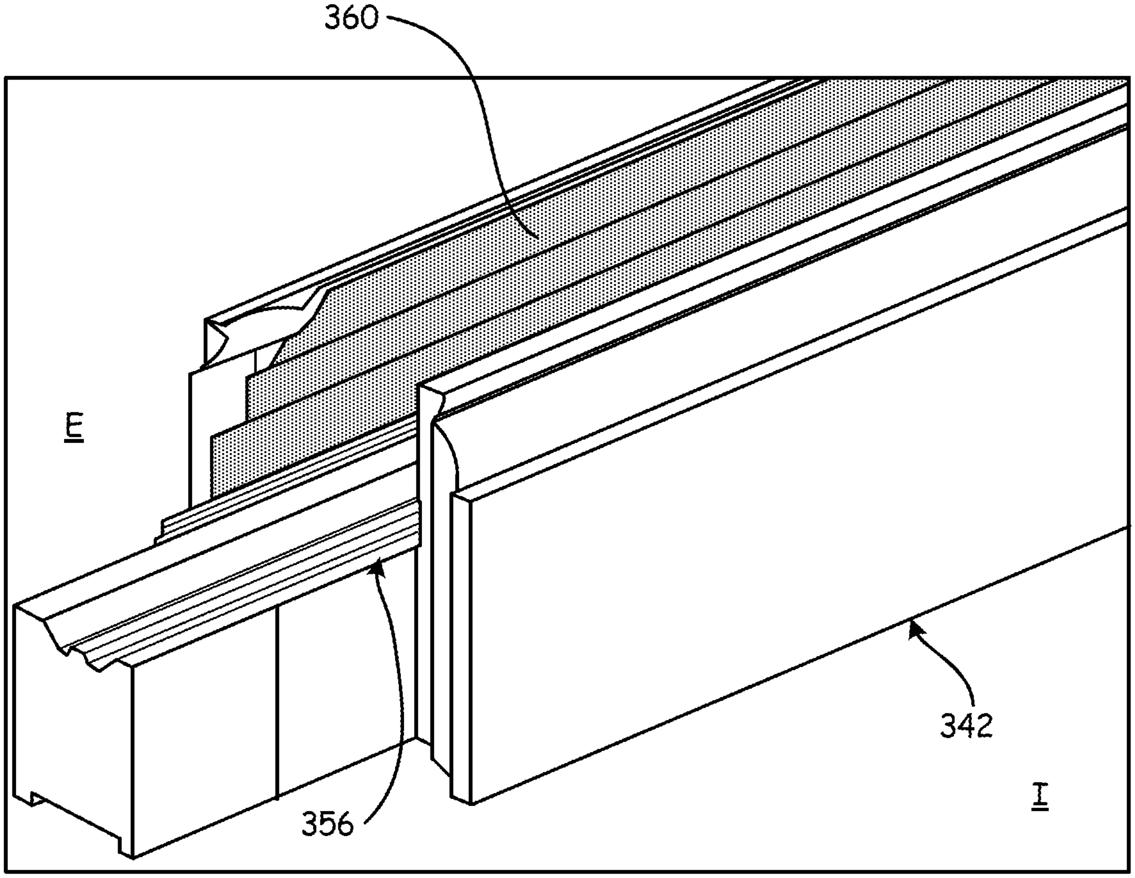
FIG. 16 shows another component of the installed fenestration product of FIGS. 14A and 14B, according to some embodiments.

As shown in FIGS. 14A and 14B, window pocket 356 may include sash pocket surface 360. Sash pocket surface 360 is a surface of window pocket 356 configured to face toward interior side I, and, thus face toward window pane surface 358. FIG. 16 is a perspective view of a portion of sash 342 illustrating sash pocket surface 360 of sash pocket 356, according to some embodiments. Sash pocket surface 360 may also be coated with a hydrophobic material, such that sash pocket surface 360 has a contact angle greater than 90 degrees. Alternatively, sash 342 may be made of a material that is inherently hydrophobic, thus assuring that sash pocket surface 360 has a contact angle greater than 90 degrees.

Figure 17:
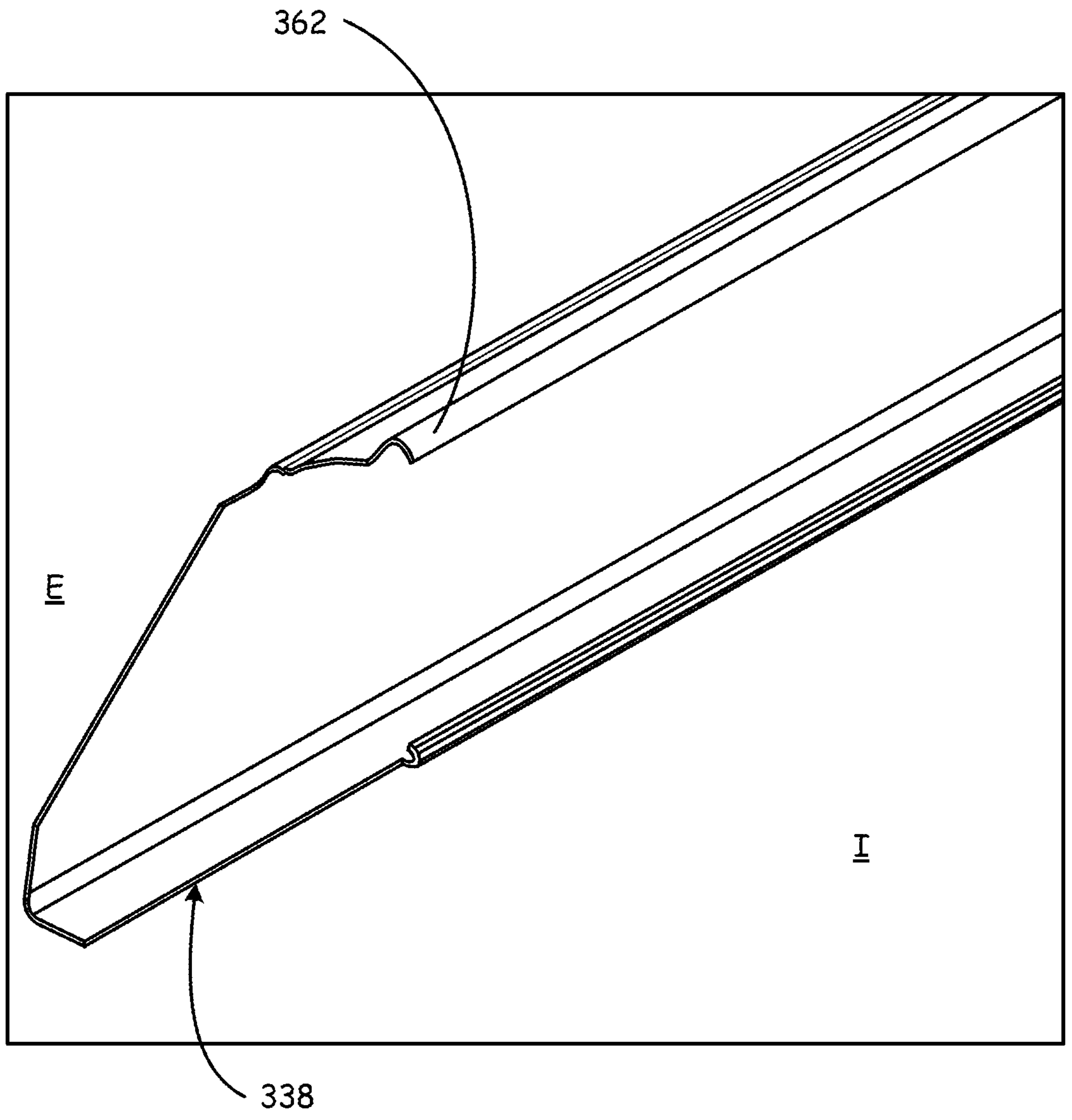
FIG. 17 shows yet another component of the installed fenestration product of FIGS. 14A and 14B, according to some embodiments.

As shown in FIGS. 14A and 14B, sash cladding 352 may include cladding edge surface 362. Cladding edge surface 362 is a portion of sash cladding 352 configured to extend into window pocket 356 when attached to sash 342 such that cladding edge surface 362 faces toward window pane surface 358. FIG. 17 is a perspective view of a portion of sash cladding 352 illustrating cladding edge surface 362, according to some embodiments. Cladding edge surface 362 may be coated with a hydrophobic material, such that sash pocket surface 360 has a contact angle greater than 90 degrees. Alternatively, sash cladding 352 may be made of a material that is inherently hydrophobic, thus assuring that cladding edge surface 362 has a contact angle greater than 90 degrees.

As shown in FIG. 14B, in some embodiments, sash seal 354 may be disposed between window pane surface 358, and both sash pocket surface 360 and cladding edge surface 362 to prevent water from penetrating into sash assembly 338. Water penetration into sash assembly 338 may result in damage to sash assembly 338. Sash seal 354 may be coated with a hydrophobic material, or alternatively, be made of a material that is inherently hydrophobic such that all surfaces of sash seal 354 have a contact angle greater than 90 degrees.

In the embodiment shown in FIG. 14B, should sash assembly 338 warp over time leading to gaps appearing between sash seal 354 and any of the adjacent surfaces, window pane surface 358, sash pocket surface 360 or cladding edge surface 362, the gaps may still be effectively sealed. The hydrophobic coatings on the adjacent surfaces facing the gaps may form a hydrophobic seal to prevent water from flowing into the gaps, preserving sash assembly 338. In some embodiments, any or all of sash seal 354, window pane surface 358, sash pocket surface 360, and cladding edge surface 362 may be coated with a super-hydrophobic material, such that the surfaces have a contact angle greater than 150 degrees, providing an even stronger, super-hydrophobic seal.

In other embodiments, sash seal 354 may be omitted entirely, such that window pane surface 358 is adjacent to sash pocket surface 360 and cladding edge surface 362. Small gaps between window pane surface 358 and sash pocket surface 360 or cladding edge surface 362 may be effectively sealed due to the formation of a hydrophobic seal by hydrophobic coatings on each of the adjacent surfaces.

Figure 18:
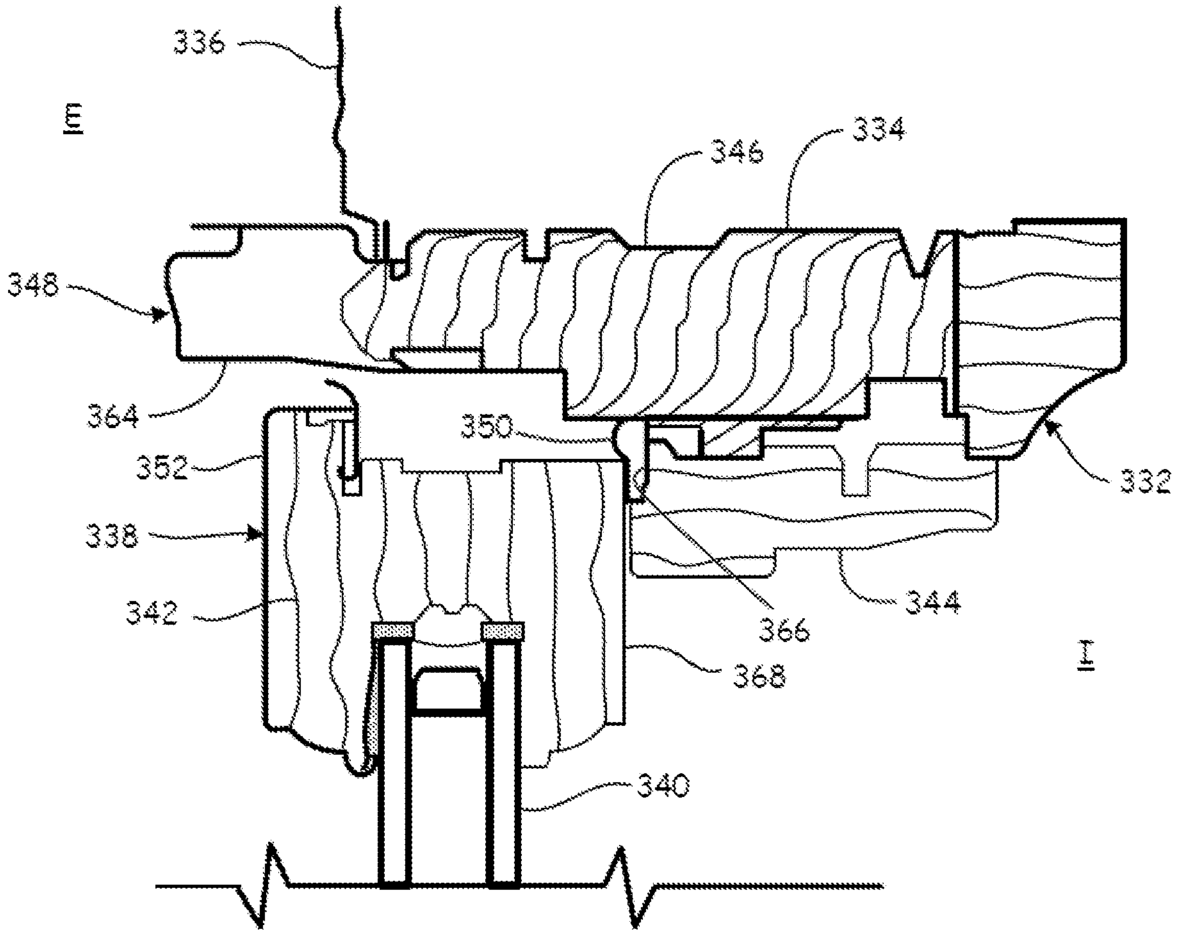
FIG. 18 is a sectional view of the installed fenestration product of FIG. 13, according to some embodiments.

FIG. 18 is a sectional view of a portion of fenestration unit 332 shown in FIG. 13. Like numbers denote the same feature as describe in reference to FIGS. 13 and 14A. FIG. 18 shows an upper portion or head of fenestration unit 332. As shown in FIG. 18, frame cladding 348 may include cladding surface 364. Cladding surface 364 is a portion of frame cladding 348 near the top of fenestration unit 332 that generally faces downward and toward the top of at least a portion of sash 342 of sash assembly 338. As shown in FIG. 18, cladding surface 364 may be extend toward interior side I to casement seal 350. Water flowing from above fenestration unit 332 and onto frame cladding 348 may tend to flow onto cladding surface 364 and toward interior side I. The flow of water may collect on the top of sash 342 and cause damage to sash 342 and sash assembly 338.

In some embodiments, cladding surface 364 may be coated with a hydrophobic material such that cladding surface 364 has a contact angle greater than 90 degrees. Alternatively, cladding surface 364 may be coated with a super-hydrophobic material such that cladding surface 364 has a contact angle greater than 150 degrees. In such embodiments, cladding surface 364 may resist an inward flow of water due to the hydrophobic coating, and reduce or prevent the flow of water from collecting on top of sash 342.

As shown in FIG. 18, sash 342 may include inner casement sill surface 366 and interior sash surface 368. Inner casement sill surface 366 is a side of inner casement sill 344 configured to face toward the casement seal 350. Interior sash surface 368 is a surface of sash 342 configured to face toward the interior side I, and thus toward casement seal 350. Casement seal 350 may connect to, and project from, inner casement sill 344 and toward exterior side E to seal the gap between inner casement sill surface 366 and interior sash surface 368 to prevent water from penetrating into the interior I when sash assembly 338 is in a closed position. At least a portion of inner casement sill surface 366 adjacent to casement seal 350 may be coated with a hydrophobic material such that the portion of inner casement sill surface 366 adjacent to casement seal 350 has a contact angle greater than 90 degrees. Alternatively, the portion of inner casement sill surface 366 adjacent to casement seal 350 may be made of a material that is inherently hydrophobic, thus assuring that the portion of inner casement sill surface 366 adjacent to casement seal 350 has a contact angle greater than 90 degrees. At least a portion of interior sash surface 368 adjacent to casement seal 350 may be coated with a hydrophobic material such that the portion of interior sash surface 368 adjacent to casement seal 350 has a contact angle greater than 90 degrees. Alternatively, the portion of interior sash surface 368 adjacent to casement seal 350 may be made of a material that is inherently hydrophobic, thus assuring that the portion interior sash surface 368 adjacent to casement seal 350 has a contact angle greater than 90 degrees. Casement seal 350 may be coated with a hydrophobic material or, alternatively, be made of a material that is inherently hydrophobic such that all surfaces of casement seal 350 have a contact angle greater than 90 degrees.

In the embodiment shown in FIG. 18, should sash assembly 338 warp over time leading to gaps appearing between casement seal 350 and either of the adjacent surfaces, inner casement sill surface 366 and interior sash surface 368, the gaps may still be effectively sealed. The hydrophobic coatings on the adjacent surfaces facing the gaps may form a hydrophobic seal to prevent water from flowing into the gaps and penetrating into the interior I when sash assembly 338 is in a closed position. In some embodiments, any or all of casement seal 350, inner casement sill surface 366, and interior sash surface 368 may be coated with a super-hydrophobic material, such that the surfaces have a contact angle greater than 150 degrees, providing an even stronger, super-hydrophobic seal.

In other embodiments, casement seal 350 may be omitted entirely, such that inner casement sill surface 366 is adjacent to interior sash surface 368. Small gaps between inner casement sill surface 366 and interior sash surface 368 may be effectively sealed due to the formation of a hydrophobic seal by hydrophobic coatings on each of the adjacent surfaces.

A flashing, such as any of the sill flashing and flashing tapes described above, may be made by providing a flashing substrate having a first surface, the first surface including a first region and a second region adjacent to the first region. Then, the contact angle of the first region is changed. The contact angle of the first region may be increased to greater than 90 degrees if the flashing substrate has a contact angle less than or equal to 90 degrees. Alternatively, the contact angle of the first region may be decreased to less than or equal to 90 degrees if the flashing substrate has a contact angle greater than 90 degrees. That is, if the flashing substrate is itself hydrophilic, then the first region is changed to be hydrophobic. Alternatively, if the flashing substrate is itself hydrophobic, then the first region is changed to be hydrophilic. Changes to the contact angle can be made by, for example, depositing a hydrophobic coating in the first region if the flashing substrate is hydrophilic, or alternatively, depositing a hydrophilic coating in the first region if the flashing substrate is hydrophobic.

In addition, portions of the first region remote from the second region may be further changed to have an increased surface area, by, for example, etching or mechanically abrading the portion of the surface to roughen the surface. Increasing the surface area of a hydrophobic surface may increase the surface contact angle and make the portion more hydrophobic and, in some embodiments, make the portion super-hydrophobic. Increasing the surface area of a hydrophilic surface may decrease the surface contact angle, making the portion more hydrophilic and, in some embodiments, make the portion more super-hydrophilic.

Embodiments are described above for use with fenestration products. However, it is understood that flashings embodying the present invention may also be employed in non-fenestration building applications. For example, as flashing for shingles, gutters, or siding applications or anywhere flashing may be used in the building construction industry.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. A sash assembly for a fenestration unit including a frame, the sash assembly having an interior side and an exterior side, the sash assembly comprising:

- a sash including a window pocket;
- a glazing panel coupled to the frame of the fenestration unit, the glazing panel being supported by the sash such that the sash surrounds the glazing panel, the glazing panel including a panel surface;
- a sash cladding including a cladding edge surface configured to extend into the window pocket of the sash and face the panel surface, the cladding edge surface being hydrophobic such that the cladding edge surface has a contact angle greater than 90 degrees; and
- a casement seal positioned within a gap defined between the frame and sash, the casement seal positioned closer to the interior side than the exterior side, and the casement seal having a contact angle greater than 90 degrees.

2. The sash assembly of claim 1, further comprising a sash seal positioned between the panel surface and the cladding edge surface.

3. The sash assembly of claim 2, wherein the sash seal is hydrophobic such that the sash seal has a contact angle greater than 90 degrees.

4. The sash assembly of claim 2, wherein the sash seal is an elastomeric seal.

5. The sash assembly of claim 1, wherein the panel surface is facing toward an exterior of the sash assembly and is positioned within the window pocket, wherein the panel surface is coated with a hydrophobic material such that the panel surface has a contact angle greater than 90 degrees.

6. The sash assembly of claim 1, wherein the window pocket of the sash includes a sash pocket surface positioned to face toward an interior side of the sash assembly, wherein the sash pocket surface is coated with a hydrophobic material such that the sash pocket surface has a contact angle greater than 90 degrees.

7. The sash assembly of claim 1, wherein the sash includes an inner casement sill surface and an interior sash surface facing toward an interior side of the sash assembly.

8. The sash assembly of claim 7, wherein the inner casement sill surface is coated with a hydrophobic material such that the inner casement sill surface has a contact angle greater than 90 degrees.

9. The sash assembly of claim 7, wherein the interior sash surface is coated with a hydrophobic material such that interior sash surface has a contact angle greater than 90 degrees.

10. The sash assembly of claim 1, wherein the cladding edge surface is coated with a super-hydrophobic material such that the cladding edge surface has a contact angle greater than 150 degrees.

11. The sash assembly of claim 2, wherein the sash seal is coated with a super-hydrophobic material such that the sash seal has a contact angle greater than 150 degrees.

12. The sash assembly of claim 1, wherein the panel surface is coated with a super-hydrophobic material such that the panel surface has a contact angle greater than 150 degrees.

13. The sash assembly of claim 6, wherein the sash pocket surface is coated with a super-hydrophobic material such that the sash pocket surface has a contact angle greater than 150 degrees.

14. A sash assembly of a fenestration unit having a frame, the sash assembly having an interior side and an exterior side, the sash assembly comprising:

- a sash including a window pocket, the window pocket including a hydrophobic sash pocket surface facing the interior side, the sash coupled to the frame of the fenestration unit and defining a gap between the frame and sash;
- a window pane supported by the sash, the window pane including a hydrophobic window pane surface facing the exterior side, wherein the hydrophobic window pane surface and the hydrophobic sash pocket surface form a hydrophobic seal;
- a sash cladding coupled to the sash; and
- a casement seal positioned within the gap defined between the frame and sash, the casement seal positioned closer to the interior side than the exterior side, and the casement seal having a contact angle greater than degrees.

15. The sash assembly of claim 14, wherein the window pane comprises a hydrophobic material.

16. The sash assembly of claim 14, wherein the sash cladding includes a hydrophobic cladding edge surface extending into the hydrophobic sash pocket surface.

17. A fenestration unit having an interior side and an exterior side, the fenestration unit comprising:

a frame;

a sash including a hydrophobic window pocket, the sash coupled to the frame and defining a gap therebetween;

a hydrophobic window pane including a glazing panel supported by the sash such that the sash surrounds the glazing panel and couples the glazing panel to the frame of the fenestration unit;

a hydrophobic sash cladding including a cladding edge surface configured to extend into the hydrophobic window pocket of the sash; and a hydrophobic casement seal positioned within the gap between the frame and the sash, the hydrophobic casement seal positioned closer to the interior side than the exterior side.

18. The fenestration unit of claim 17, further comprising a frame cladding coupled to the frame, the frame cladding including a hydrophobic cladding surface that extends within the gap.

19. The sash assembly of claim 1, wherein a portion of the sash cladding extends within the gap defined between the sash and the frame, the portion of the sash cladding defining a projection extending outwardly relative to the sash cladding.

20. The sash assembly of claim 1, wherein the gap includes a hydrophobic material extending between the exterior and interior side with a contact angle greater than 90 degrees to resist the flow of water toward the casement seal.

* * * * *